(12) United States Patent
Coates et al.

(10) Patent No.: US 6,217,955 B1
(45) Date of Patent: Apr. 17, 2001

(54) LIQUID CRYSTAL DISPLAY DEVICE

(75) Inventors: David Coates, Wimborne; Simon Greenfield; Mark Goulding, both of Poole; James Hanmer, Ringwood; Shirley Marden; Owain Llyr Parri, both of Poole, all of (GB)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 09/117,710

(22) PCT Filed: Feb. 21, 1997

(86) PCT No.: PCT/EP97/00844

§ 371 Date: Aug. 4, 1998

§ 102(e) Date: Aug. 4, 1998

(87) PCT Pub. No.: WO97/35219

PCT Pub. Date: Sep. 25, 1997

(30) Foreign Application Priority Data

Mar. 19, 1996 (EP) .................................................. 96104332

(51) Int. Cl.$^7$ .............................. C09K 19/38; F21V 9/14; G02F 1/1335
(52) U.S. Cl. .................................... 428/1.31; 252/299.01; 252/585; 349/98
(58) Field of Search ................... 252/299.01, 585, 252/299.7; 349/193, 96, 98, 194, 113; 428/1.31

(56) References Cited

U.S. PATENT DOCUMENTS

| | | | |
|---|---|---|---|
| 5,506,704 | * | 4/1996 | Broer et al. ............................ 359/63 |
| 5,560,864 | * | 10/1996 | Goulding ........................ 252/299.01 |
| 5,762,823 | * | 6/1998 | Hikmet .............................. 252/299.01 |
| 5,798,057 | * | 8/1998 | Hikmet ................................ 252/299.5 |
| 6,007,745 | * | 12/1999 | Coates et al. ......................... 252/585 |
| 6,099,758 | * | 8/2000 | Verrall et al. ......................... 252/585 |
| 6,117,920 | * | 9/2000 | Jolliffe et al. ........................ 522/170 |

FOREIGN PATENT DOCUMENTS

| | | |
|---|---|---|
| 195 04 224 | 8/1995 | (DE) . |
| 0 606 939 | 7/1994 | (EP) . |
| 0 606 940 | 7/1994 | (EP) . |
| 0 643 121 | 3/1995 | (EP) . |
| 2 297 556 | 8/1996 | (GB) . |
| 2 299 333 | 10/1996 | (GB) . |

* cited by examiner

*Primary Examiner*—Shean C. Wu
(74) *Attorney, Agent, or Firm*—Millen White Zelano & Branigan

(57) ABSTRACT

A liquid crystal display device containing a liquid crystal cell and at least one reflective polarizer or a polarizer combination having at least one reflective polarizer as a means to generate circular polarized light. The reflective polarizer includes an optically active layer of an anisotropic polymer material with a helically twisted planar molecular orientation. The material is oriented so that the axis of the molecular helix extends transversely to the layer, and the pitch of the molecular helix is varied in such a manner that the difference between the maximum pitch and the minimum pitch is at least 100 nm. The reflective polarizer is obtainable by copolymerization of a mixture of a chiral polymerizable mesogenic material including a) at least one achiral polymerizable mesogenic compound having at least one polymerizable functional group in the presence of b) at least one chiral polymerizable mesogenic compound having one polymerizable functional group and/or at least one non-polymerizable chiral mesogenic compound, c) an initiator, d) optionally a non-mesogenic compound having at least one polymerizable functional group, e) optionally a dye and, f) optionally a stabilizer. The invention also discloses methods of manufacturing such a reflective polarizer. The invention further discloses a mixture of a chiral polymerizable mesogenic material used for manufacturing such a reflective polarizer.

17 Claims, 12 Drawing Sheets

LIQUID CRYSTAL DISPLAY DEVICE

The invention relates to a liquid crystal display device comprising a liquid crystal cell and at least one reflective polarizer or a polarizer combination comprising at least one reflective polarizer as a means to generate circular polarized light, said reflective polarizer comprising an optically active layer of an anisotropic polymer material with a helically twisted planar molecular orientation, wherein the material is oriented so that the axis of the molecular helix extends transversely to the layer, in which the pitch of the molecular helix is varied in such a manner that the difference between the maximum pitch and the minimum pitch is at least 100 nm, characterized in that said reflective polarizer is obtainable by copolymerization of a mixture of a chiral polymerizable mesogenic material comprising a) at least one achiral polymerizable mesogenic compound having at least one polymerizable functional group in the presence of b) at least one chiral polymerizable mesogenic compound having one polymerizable functional group and/or at least one non-polymerizable chiral mesogenic compound, c) an initiator, d) optionally a non-mesogenic compound having at least one polymerizable functional group, e) optionally a dye and f) optionally a stabilizer.

The invention also relates to methods of manufacturing said reflective polarizers. The invention further relates to mixtures of chiral polymerizable mesogenic material used for the manufacturing of said reflective polarizers.

Figure 1:
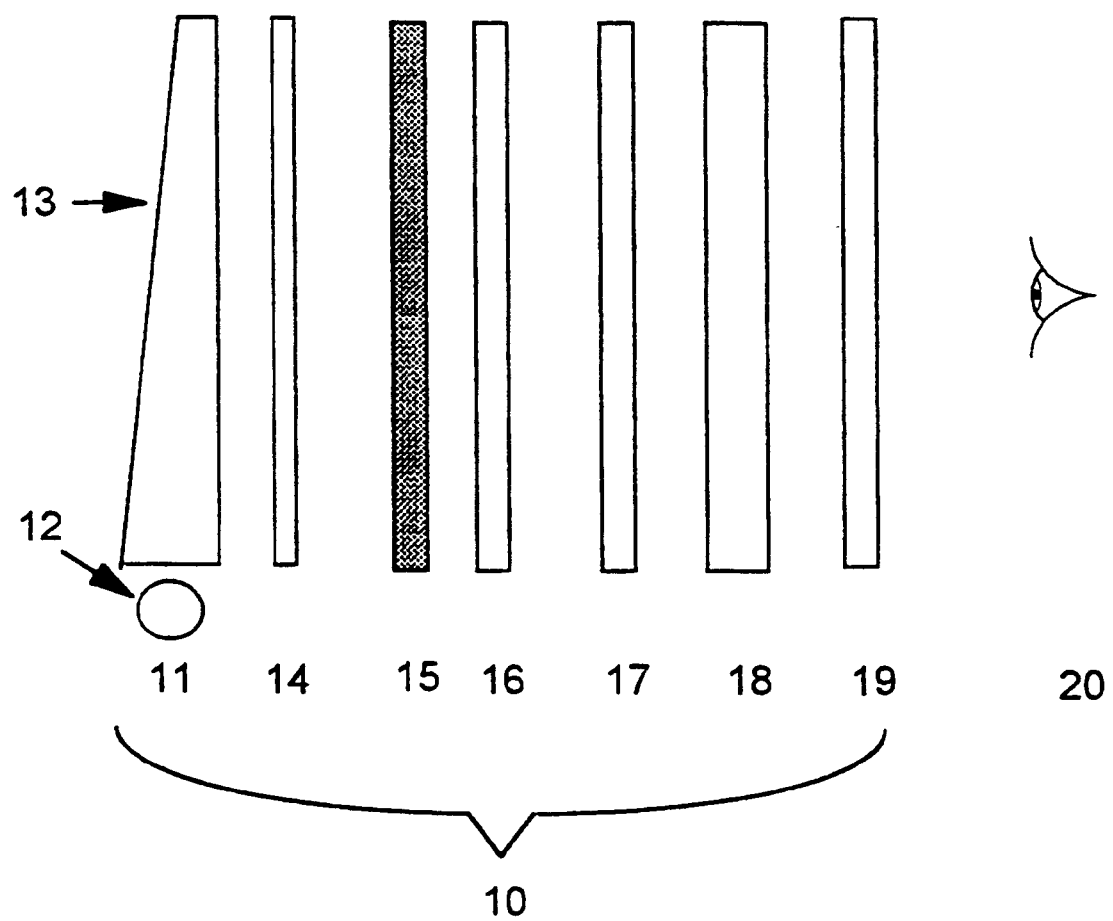
FIG. 1 shows a display device according to an exemplary embodiment of the present invention.

In liquid crystal displays of the state of the art the brightness normally is being considerably affected by light absorption in the optical path. In particular, the polarizers in a conventional twisted nematic liquid crystal display can absorb more than 60% of the light intensity emitted by the backlight. Therefore strong efforts are made to reduce the absorption of the polarizers and enhance the brightness of the display. For backlit direct view LC displays this reduction could additionally lead to significantly reduced power consumption and longer backlight bulb life and in portable devices to improvements of the battery life and size.

The most widely used polarizers are sheet polarizers for producing linearly polarized light. These polarizers have the disadvantage that under optimum conditions maximally 50% of the intensity of incident light are transmitted as linear polarized light. Apart from the low efficiency of these polarizers, another drawback is the absorption of the untransmitted component of light, which causes considerable heating of the polarizer and can thereby lead to undesired changes in its polarization characteristic or, at high backlight intensities, even to destruction of the polarizer.

By using a reflective polarizer it is possible to very efficiently convert unpolarized light into polarized light. This type of polarizer comprises a layer of a chiral mesogenic material with a helically twisted molecular orientation. When such a polarizer is irradiated with unpolarized light, the helical molecular structure interacts with incident light of a wavelength compatible with the product of the pitch of the helix and the mean refractive index of the mesogenic material. This interaction leads to reflection of 50% of the light intensity as circularly polarized light with the same sense of circular polarisation as the twist sense of the helix (right- or left-handed respectively), whereas the remaining 50% and the wavelengths of the incident light not interacting with the mesogenic material are transmitted. The reflected light can then be depolarized or its sense of polarization can be reversed by means of a mirror, for example in the backlight of the display, and again be directed onto the polarizer.

In this manner theoretically 100% of a certain waveband of the incident unpolarized light can be converted into circularly polarized light. The bandwidth $\Delta\lambda$ of this waveband is depending on the birefringence of the mesogenic material $\Delta n$ and the pitch of the molecular helix p according to the equation $\Delta\lambda = \Delta n \times p$. However, in practice the value of the birefringence of the available mesogenic materials is smaller than 0.3, thus limiting the bandwidth. In general, the bandwidths have values ranging between 30 and 50 nm, but not more than 100 nm, which is not sufficient for many applications. In particular bandwidths covering a substantial portion of the visible spectrum of light are very interesting for industrial applications.

This problem has been tried to overcome by the use of polarizers made up of a number of layers with different reflection wavelengths. Such an attempt is described in Maurer et al., SID Digest 1990, p. 110. However, the optical quality of these multilayer polarizers deteriorates rapidly due to local irregularities in the molecular orientation and internal scattering or reflection. Another problem is the high thickness of a multilayer polarizer, which leads to limitation of the viewing angle.

The European Patent Application EP 0 606 940 suggests a cholesteric polarizer having a bandwidth of at least 100 nm. This polarizer is prepared by photopolymerization of a mixture comprising a chiral mesogenic bisacrylate, an achiral mesogenic monoacrylate and a dye. The mixture is coated onto transparent substrates carrying a polyimide orientation layer and cured by UV irradiation. The dye is added to induce a gradient of the intensity of UV light in the layer of the coated monomer mixture during polymerization. This intensity gradient is supposed to cause monomer diffusion in the layer during polymerization due to the different reactivity of the two monomers. As a result, the composition of the polymer material and consequently the pitch of the molecular helix varies constantly in the direction transverse to the polymer layer, leading to a broad bandwidth of the polarizer.

However, the diffusion concept described above is very sensitive to outside influences. Thus for example even slight changes of the mixture composition, the lamp power, the substrate and in particular the concentration of the dye and the photoinitiator can have a considerable impact on the bandwidth of the polarizer. As can be seen in table I and II of the above mentioned EP 0 606 940, for example a small change in the dye concentration leads to a significant decrease of the bandwidth.

Another drawback of this concept are the comparably long curing times that are required for monomer diffusion and building up of the concentration gradient. In the above mentioned application curing times of at least 8 minutes are disclosed, which is not suitable for mass production. It is not possible to use high lamp power to reduce curing time, since this would lead to reduction of the intensity gradient and thereby the pitch gradient as can be seen from table I of the application.

Besides, in the above mentioned application only mixtures with chiral direactive mesogens are disclosed. These compounds, however, are very expensive and are obtainable only in low yields.

It is therefore an aim of the present invention to provide a reflective broadband polarizer. The bandwidth of the polarizer should preferably comprise a substantial portion of the visible spectrum of light. The invention also aims at providing methods of manufacturing such a polarizer in an efficient and cost-effective manner which are in particular suitable for mass production as well as a liquid crystal display device comprising such a polarizer. Other aims of the invention and its advantages over prior art are immediately evident to the person skilled in the art from the following description.

It has now been found that the above mentioned aims can be achieved and the drawbacks of prior art can be overcome by using the invention as described in the foregoing and the following to its full extent.

The term reactive compound as used in the foregoing and the following is indicating a polymerizable compound, i.e. a compound exhibting one (monoreactive), two (direactive) or more (multireactive) polymerizable functional groups.

The terms polymerizable or reactive mesogen, polymerizable or reactive mesogenic compound and polymerizable or reactive liquid crystal compound as used in the foregoing and the following comprise compounds with a rodlike or boardlike mesogenic group. These compounds do not necessarily have to exhibit mesophase or liquid crystal phase behaviour by themselves. It is also possible that they can show mesophase or liquid crystal phase behaviour only in mixtures with other compounds or when the pure compounds or the mixtures are polymerized.

The object of the invention is a liquid crystal display device comprising a liquid crystal cell and at least one reflective polarizer or a polarizer combination comprising at least one reflective polarizer as a means to generate circular polarized light, said reflective polarizer comprising an optically active layer of an anisotropic polymer material with a helically twisted planar molecular orientation, wherein the material is oriented so that the axis of the molecular helix extends transversely to the layer, in which the pitch of the molecular helix is varied in such a manner that the difference between the maximum pitch and the minimum pitch is at least 100 nm, characterized in that said reflective polarizer is obtainable by copolymerization of a mixture of a chiral polymerizable mesogenic material comprising a) at least one achiral polymerizable mesogenic compound having at least one polymerizable functional group in the presence of b) at least one chiral polymerizable mesogenic compound having one polymerizable functional group and/or at least one non-polymerizable chiral mesogenic compound, c) an initiator, d) optionally a non-mesogenic polymerizable compound having at least one polymerizable functional group, e) optionally a dye and f) optionally a stabilizer.

Preferably the spectrum of light transmitted by the reflective polarizer has an at least bimodal peak distribution.

Preferred embodiments of the invention are those wherein
the liquid crystal display device comprises at least one optical retardation film, the retardation of which is approximately 0.25 times the wavelength of the band reflected during operation of the reflective polarizer.

the liquid crystal display device comprises a linear polarizer preferably situated in the optical path between the reflective polarizer and the liquid crystal cell.

the linear polarizer is situated in such a manner that the angle between the optical axis of the polarizer and the major optical axis of the retardation film is from 30 degrees to 60 degrees.

the liquid crystal display device comprises a light diffusion sheet preferably situated in the optical path between the reflective polarizer and the source of light incident on the display.

Another object of the invention is a reflective polarizer comprising an optically active layer of an anisotropic polymer material with a helically twisted planar molecular orientation, wherein the material is oriented so that the axis of the molecular helix extends transversely to the layer, in which the pitch of the molecular helix is varied in such a manner that the difference between the maximum pitch and the minimum pitch is at least 100 nm, characterized in that said reflective polarizer is obtainable by A) coating a mixture of a chiral polymerizable mesogenic material comprising a) at least one achiral polymerizable mesogenic compound having at least one polymerizable functional group in the presence of b) at least one chiral polymerizable mesogenic compound having one polymerizable functional group and/or at least one non-polymerizable chiral mesogenic compound,
c) an initiator,
d) optionally a non-mesogenic polymerizable compound having at least one polymerizable functional group,
e) optionally a dye and
f) optionally a stabilizer on at least one substrate in form of a layer, B) aligning said mixture in an orientation so that the axis of the molecular helix extends transversely to the layer, C) polymerizing said mixture by exposing it to heat or actinic radiation, and D) optionally removing one or both of the substrates from the polymerized material.

In a preferred embodiment of the invention the polymerized material forms a three-dimensional network.

Further preferred embodiments are characterized in that the chiral polymerizable mesogenic material contains at least one chiral polymerizable mesogenic compound having one polymerizable functional group and at least one achiral polymerizable mesogenic compound having one polymerizable functional group.

at least one chiral polymerizable mesogenic compound having one polymerizable functional group and at least one achiral polymerizable mesogenic compound having two or more polymerizable functional groups.

In a preferred embodiment of the present invention the polymerizable mesogenic compounds are selected of formula I

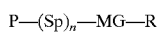    P—(Sp)$_n$—MG—R            I wherein
P is a polymerizable group,
Sp is a spacer group having 1 to 20 C atoms,
n is 0 or 1,
MG is a mesogenic or mesogenity supporting group, preferably linked to the spacer group Sp and the organic group R by an ester or ether group or a single bond, this mesogenic group being preferably selected of formula II

    —(A$^1$—Z$^1$)$_m$—A$^2$—Z$^2$—A$^3$—        II wherein
A$^1$, A$^2$ and A$^3$ are independently from each other 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene or naphthalene-2,6-diyl, it being possible for all these groups to be unsubstituted, mono- or polysubstituted with halogen, cyano or nitro groups or alkyl, alkoxy or alkanoyl groups having 1 to 7 C atoms wherein one or more H atoms may be substituted by F or Cl, Z$^1$ and Z$^2$ are each independently —COO—, —OCO—, —CH$_2$CH$_2$—, —OCH$_2$—, —CH$_2$O—, —CH=CH—, —C≡C—, —CH=CH—COO—, —OCO—CH=CH— or a single bond and m is 0, 1 or 2, and R is an alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO— —OCO—, —OCO—O—, —S—CO—, —CO—S— or —C≡C— in such a manner that oxygen atoms are not linked directly to one another, or alternatively R is halogen, cyano or has independently one of the meanings given for P—(Sp)$_n$—.

Another object of the invention are mixtures of a chiral polymerizable mesogenic material as described in the foregoing and the following.

In a preferred embodiment the polymerizable mixture comprises polymerizable mesogenic compounds having only one polymerizable group. These compounds are in general easier and cheaper to synthesize. Furthermore, mixtures comprising only monoreactive compounds often show higher stability against unintended spontaneous polymerization than mixtures comprising direactive compounds.

Another preferred embodiment incorporates the use of mixtures comprising at least one chiral or achiral polymerizable mesogenic compound having one polymerizable group (monofunctional) and at least one achiral polymerizable mesogenic compound having two or more polymerizable groups (multifunctional). When polymerized, this material forms a three-dimensional network. Such a crosslinked polymer network film exhibits an exceptionally high mechanical stability. In practice it can be used as a self-supporting polarization film which needs not be provided with substrates. After the manufacture of such a reflective polarizer the substrates necessary for the polymerization and/or orientation can be removed, which is favourable for the compactness of the polarizer. Another advantage of this type of polarizer is the extremely small temperature dependence of the polarization characteristic.

By varying the concentration of the multifunctional mesogenic or non mesogenic compounds the crosslink density of the polymer film and thereby its physical and chemical properties such as the glass transition temperature, which is also important for the temperature dependence of the optical properties of the polarizer, the thermal and mechanical stability or the solvent resistance can be tuned easily.

In another preferred embodiment the polymerizable mixture comprises up to 20%, preferably 5 to 20% of a non mesogenic compound with two or more polymerizable functional groups to increase crosslinking of the polymer. Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

In another preferred embodiment the polymerizable mixture comprises up to 70%, preferably 5 to 70% of a non mesogenic compound with one polymerizable functional group. Typical examples for monofunctonal non mesogenic monomers are alkylacrylates or alkylmethacrylates.

The polymerizable mixture used for preparation of the inventive polarizer comprises at least one achiral and at least one chiral compound. By changing the ratio of chiral and achiral compounds the position of the reflected wavelength band of the polarizer can be varied. Preferably the ratio of the chiral and achiral mesogenic compound is selected so that the reflected spectrum is covering a substantial part of the spectrum of visible light.

Thus the wavelength of the center of the reflected waveband is preferably from 450 to 650 nm, especially preferably from 480 to 600 nm and very particularly preferably from 500 to 550 nm.

The bandwidth of the wavelength band is preferably larger than 100 nm, particularly preferably larger than 200 nm, very particularly preferably larger than 250 nm.

In another preferred embodiment the chiral polymerizable mesogenic mixture comprises up to 20% by weight of a non-polymerizable mesogenic compound, in particular preferably a non-polymerizable chiral mesogenic compound which is used as a chiral dopant to adapt the optical properties of the polymer.

Chiral polymerizable mesogenic mixtures are preferred that contain at least one, very preferably one to four, in particular one or two chiral non-polymerizable mesogenic compounds as chiral dopants. The proportion of said chiral dopants is preferably 0.01 to 20%, very preferably 0.05 to 10%, in particular 0.1 to 5% by weight of the total mixture.

As a chiral dopant in principal all compounds can be used that are known to the skilled in the art for this purpose. Typical chiral dopants are e.g. the commercially available S 1011, R 811 or CB 15 (Merck KGaA, Darmstadt, Germany).

Further preferred are chiral polymerizable mesogenic mixtures wherein one or more of the chiral dopants are compounds comprising a chiral bivalent structure element based on a sugar molecule.

Of these chiral polymerizable mesogenic mixtures especially preferred are those wherein the chiral dopants are compounds of formula V $$R^2\text{—MG—CG—MG—}R^3 \qquad \qquad V$$

wherein MG in each case independently is denoting a mesogenic group of formula II, $R^2$ and $R^3$ are each independently halogen, cyano or an optionally halogenated alkyl or alkoxy group with 1 to 12 C atoms, and CG is the following structure element

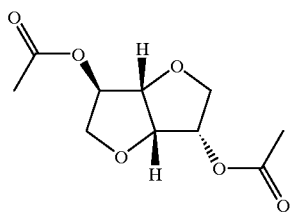

The chiral dopants of formula V can be synthesized according to or in analogy to the following reaction schemes

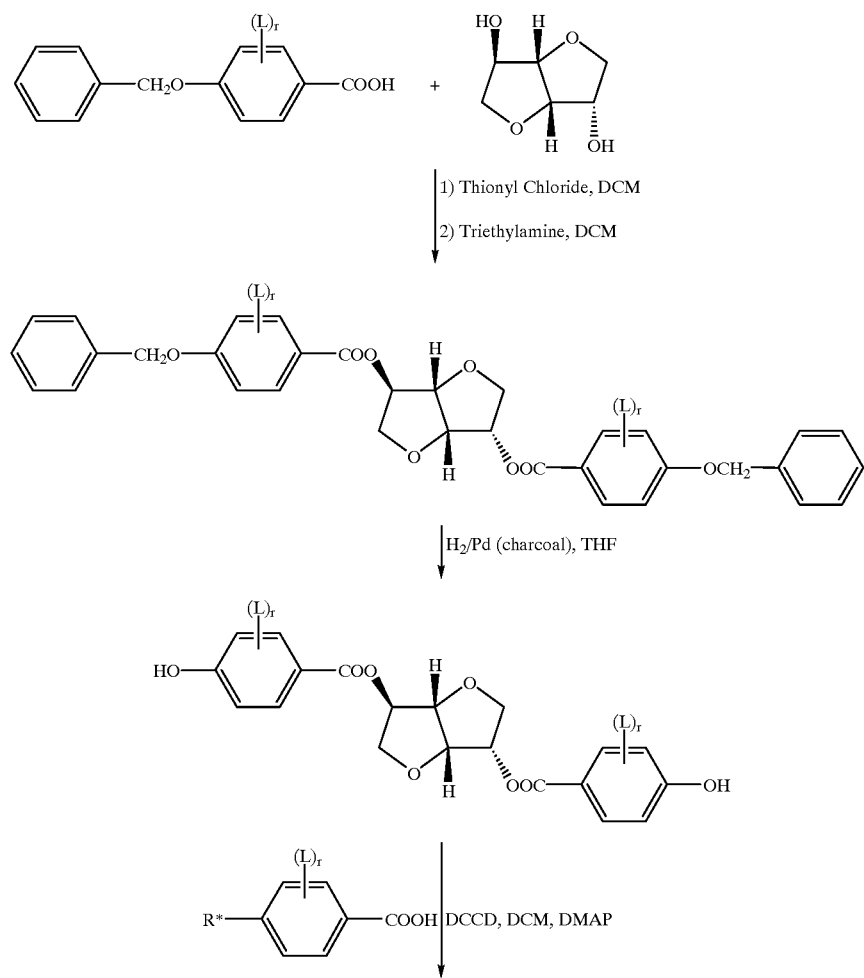

-continued

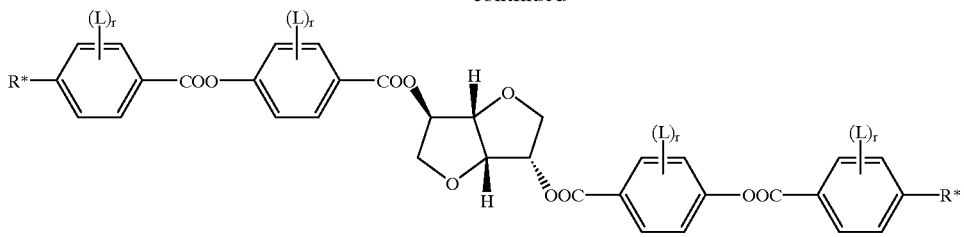

Scheme 2

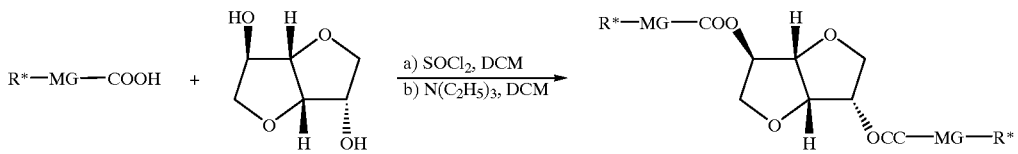

DCCD = dicyclohexylcarbodiimide, DMAP = dimethylaminopyridine,
DCM = dichloromethane.

In the reaction schemes 1 and 2 R* is denoting an alkyl or alkoxy group with 1 to 12 C atoms, L and r have the meanings given below and MG has the meaning of formula II.

Preferred embodiments of the invention are relating to a reflective polarizer as described in the foregoing and the following that is obtainable by copolymerization of one of the following mixtures of a chiral polymerizable mesogenic material a mixture essentially consisting of
- 5 to 85% by weight of an achiral polymerizable mesogenic compound having one polymerizable functional group,
- 0 to 30% by weight of an achiral polymerizable mesogenic compound having two or more polymerizable functional groups,
- 10 to 80% by weight of a chiral polymerizable mesogenic compound having one polymerizable functional group,
- 0.1 to 5% by weight of an initiator,
- 0 to 5% by weight of a non-polymerizable chiral dopant,
- 0 to 5% by weight of a dye and
- 10 to 1000 ppm of a stabilizer.

a mixture essentially consisting of
- 10 to 85% by weight of an achiral polymerizable mesogenic compound having two or more polymerizable functional groups,
- 10 to 90% by weight of a chiral polymerizable mesogenic compound having one polymerizable functional group,
- 0.1 to 5% by weight of an initiator,
- 0 to 5% by weight of a non-polymerizable chiral dopant,
- 0 to 5% by weight of a dye and
- 10 to 1000 ppm of a stabilizer.

a mixture essentially consisting of
- 0 to 85% by weight of an achiral polymerizable mesogenic compound having one polymerizable functional group,
- 0 to 70% by weight of an achiral polymerizable mesogenic compound having two or more polymerizable functional groups,
- 10 to 85% by weight of a chiral polymerizable mesogenic compound having one polymerizable functional group,
- 3 to 70% by weight of a non-mesogenic polymerizable compounds having at least one polymerizable functional group,
- 0.1 to 5% by weight of an initiator,
- 0 to 5% by weight of a non-polymerizable chiral dopant,
- 0 to 5% by weight of a dye and
- 10 to 1000 ppm of a stabilizer.

In another preferred embodiment of the present invention the chiral polymerizable mesogenic material does not contain a chiral polymerizable compound.

In another preferred embodiment of the present invention the chiral polymerizable mesogenic material does not contain a polymerizable mesogenic compound with more than one polymerizable group.

The transmission versus wavelength curve of the transmission spectrum (as depicted, for example, in the FIGS. 2 to 11) of a reflective polarizer according to the present invention can be of symmetric or asymmetric shape. It can be unimodal, bimodal or exhibit a multiple peak distribution, which means that it can show one, two or more than two local maxima of reflection. A preferred embodiment of the present invention is characterized in that the spectrum has an at least bimodal peak distribution.

The inventive polymerizable mixture is coated onto at least one substrate in form of a layer, aligned and polymerized. As a substrate a glass sheet as well as a plastic film can be used. It is also possible to put a second substrate on top of the coated mixture prior to, during and/or after polymerization. The substrates can be removed or not after polymerization. When using two substrates, at least one substrate has to be transmissive for the actinic radiation used for the polymerization.

Preferably at least one substrate is a plastic substrate such as for example a polyethyleneterephthalate (PET), polyvinylalcohol (PVA), polycarbonate (PC) or triacetylcellulose (TAC) film, preferably a PET film.

Uniform alignment of the coated polymerizable mixture prior to polymerization can be achieved for example by shearing the material, e.g. by means of doctor blade. It is also possible to apply an alignment layer, for example a layer of rubbed polyimide or sputtered $SiO_x$, on top of one substrate to induce uniform planar alignment. i.e. alignment with the molecular helix extending transversely to the layer of the mesogenic material. In case a second substrate is put on top of the coated material, the shearing caused by putting together the two substrates is often sufficient to give good alignment. In a preferred embodiment of the invention the alignment is achieved by shearing the chiral polymerizable mesogenic material.

Polymerization of the inventive polymerizable mesogenic mixture takes place by exposing it to heat or to actinic radiation. Actinic radiation is e.g. irradiation with light, X-rays, gamma rays or irradiation with high energy particles, such as ions or electrons. In particular preferably UV light is used. The irradiation wavelength is preferably from 250 nm to 400 nm, especially preferably from 340 nm to 380 nm.

As a source for actinic radiation for example a single UV lamp or a set of UV lamps can be used. When using a high lamp power the curing time can be reduced. The irradiance produced by the lamp used in the invention is preferably from 0.01 to 100 mW/cm$^2$, especially preferably from 0.05 to 10 mW/cm$^2$ and very particularly preferably from 0.1 to 1.0 mW/cm$^2$.

The curing time is dependent inter alia on the reactivity of the polymerizable mesogenic material, the thickness of the coated layer, the type of polymerization initiator and eventually the dye. It also has an influence on the degree of polymerization or crosslinking of the polymer film and thereby on the polarization characteristic of the reflective polarizer. For mass production short curing times are preferred. The curing time according to the invention is preferably not longer than 20 minutes, especially preferably not longer than 8 minutes and very particularly preferably shorter than 4 minutes.

The polymerization is carried out in the presence of an initiator having an absorption maximum adjusted to the wavelength of the actinic radiation. For example, when polymerizing by means of UV light, a photoinitator can be used that decomposes under UV irradiation to produce free radicals that start the polymerization reaction. It is also possible to use a cationic photoinitiator that photocures with cations instead of free radicals. The polymerization may also be started by an initiator that decomposes when heated above a certain temperature.

Typical examples of photoinitiators for radical polymerization by UV irradiation are the commercially available Irgacure 651, Irgacure 184 or Darocure 4205 (all from Ciba Geigy AG), whereas in case of cationic photopolymerization e.g. the commercially available UVI 6974 (Union Carbide) can be used.

The chiral polymerizable mesogenic material preferably comprises 0.05 to 10%, very preferably 0.1 to 5%, in particular 0.2 to 3% of a polymerization initiator. UV photoinitiators are preferred. Particularly preferred are photoinitiators that decompose under UV irradiation to produce free radicals.

In addition to light- or temperature-sensitive initiators the polymerizable mixture may also comprise one or more other suitable components such as, for example, catalysts, stabilizers, co-reacting monomers or surface-active compounds.

In a preferred embodiment of the invention, the polymerizable mixture comprises a stabilizer that is used to prevent undesired spontaneous polymerization for example during storage of the mixture. As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

The polymerizable mixture according to this preferred embodiment preferably comprises a stabilizer as described above at an amount of 1 to 1000 ppm, especially preferably 10 to 500 ppm.

Other additives, like e.g. chain transfer agents, can also be added to the polymerizable mixture in order to modify the physical properties of the inventive polymer film. For example when adding a chain transfer agent to the polymerizable mixture, the length of the free polymer chains and/or the length of the polymer chains between two crosslinks in the inventive polymer film can be controlled. When the amount of the chain transfer agent is increased, polymer films with decreasing polymer chain length are obtained.

In a preferred embodiment of the present invention the polymerizable mixture comprises 0.01 to 15%, in particular 0.1 to 10%, very preferably 0.5 to 5% of a chain transfer agent. The polymer films according to this preferred embodiment show especially good adhesion to a substrate, in particular to a plastic film, like e.g. a TAC film. Furthermore, by using polymerizable mesogenic mixtures comprising a chain transfer agent a reflective polarizer with increased bandwidth can be obtained.

As a chain transfer agent for example monofunctional thiol compounds like e.g. dodecane thiol or multifunctional thiol compounds like e.g. trimethylpropane tri(3-mercaptopropionate) can be used.

In some cases it is of advantage to apply a second substrate to aid alignment and exclude oxygen that may inhibit the polymerization. Alternatively the curing can be carried out under an atmosphere of inert gas. In the latter case shearing of the mesogenic material prior to polymerization is necessary to cause sufficient alignment of the mesophase. When using a cationic photoinitiator oxygen exclusion is not needed, but water should be excluded. In a preferred embodiment of the invention the polymerization of the chiral polymerizable mesogenic material is carried out under an atmosphere of inert gas, preferably under a nitrogen atmosphere.

To obtain polymer films with a high quality of alignment the polymerization has to be carried out in the liquid crystal phase of the polymerizable mesogenic mixture. Therefore for the manufacturing of an inventive reflective polarizer preferably mixtures with low melting points are used. The polymerization process is then made easier, which is of importance especially for mass production.

Curing temperatures below 150° C. are preferred. Especially preferred are temperatures below 100° C.

The thickness of the optically active polymer film is dependent on the band width of the reflective polarizer. Depending on the band position and the bandwidth, the thickness is preferably from 5 to 30 $\mu$m. For bandwidths of about 300 nm, a thickness of 10 to 20 $\mu$m is particularly preferred.

In a preferred embodiment the mixture of the chiral polymerizable mesogenic material additionally contains a dye having an absorption maximum whose wavelength is adjusted to the wavelength of the actinic radiation used. Preferably, a dye is used whose absorption maximum lies outside the operation wavelength range of the reflective polarizer in order to exclude undesired absorptions during the use of the polarizer.

In another preferred embodiment of the invention the chiral polymerizable mesogenic mixture contains no dye.

The light which is passed through the reflective polarizer according to this invention is substantially circular polarized light in a right-handed or lefthanded sense, in accordance with the twist sense of the molecular helix of the polymer layer, which may be a right-handed or a left-handed helix.

For some applications it is desirable that the transmitted light is linear polarized. In a preferred embodiment of the invention the liquid crystal display device therefore comprises an optical compensation film. This compensation film is comprising a layer of a birefringent material selected such that its retardation, that is the product of the birefringence and the thickness of the layer is approximately 0.25 times the wavelength of the centre of the bandwidth reflected by the polarizer. As a result, this compensator serves as a quarter wave plate or foil (QWF) which converts circular polarized light into linear polarized light.

As a compensator, for example a stretched plastic film, such as stretched PET, PVA, PC or TAC can be used. It is also possible to use a layer of an oriented polymerized liquid crystalline material.

The QWF may be connected to the reflective polarizer as a separate optical element. Preferably, the reflective polarizer and the QWF are integrated so that they form an individual optical element.This can be done for example by laminating the QWF and the reflective polarizer together after manufacturing the polarizer.

In another preferred embodiment the chiral polymerizable mesogenic material is coated and cured directly on a QWF which serves as a substrate, thus simplifying the production process.

When a single optical compensation film is used together with the reflective polarizer, the optical retardation remains the same over the entire bandwidth of the polarizer. As a result, the conversion from circularly polarized light into linearly polarized light is not optimal over the entire bandwidth of the polarizer. This can be a disadvantage in particular for broadband polarizers.

Therefore in a preferred embodiment the inventive liquid crystal display device comprises a combination of two or more optical compensation layers, the retardation of the compensators selected in such a manner that due to the difference in retardation of the layers the nett retardation of the compensator combination is approximately 0.25 times the wavelength of the light reflected by the polarizer over a substantial portion of the reflected bandwidth of the polarizer.

The light incident on the reflective polarizer is tranformed into circularly polarized light. However, this is valid only for light with a wavelength corresponding to the bandwidth of the polarizer and light at normal incidence, i.e. parallel to the axis of the molecular helix For example light passing through the reflective polarizer at an angle to the normal will become elliptically polarized. This light will not be transformed completely into linear polarized light of a single plane of polarization by the optical compensator following behind the reflective polarizer. Especially when using the inventive polarizer combination for the illumination of a liquid crystal display cell, this component of light can lead to undesired reduction of the contrast of the display. Therefore in a preferred embodiment of the present invention a linear polarizer is provided in the optical path of the display after the optical compensator in order to shut off the component of light emitting from the reflective polarizer which is not ideally circularly polarized.

The linear polarizer disclosed above is preferably provided such that the angle between its optical axis and the major optical axis of the compensator is ranging from 30 to 60 degrees, especially preferably between 40 and 50 degrees.

The inventive reflective polarizer is reflecting 50% of the incident light of the polarizer bandwidth as circular polarized light. As described above, the high efficiency of the reflective polarizer is achieved by making use of this reflected light after it has been reversed, for example in the backlight unit of the display, and directed back again to the polarizer.

In case a metallic reflector is used, circular polarized light is ideally reflected as circular polarized with opposite twist sense, which is now compatible with the helix of the reflective polarizer and is fully transmitted.

In case a non metallic reflector is used or additional diffusors such as diffuser sheets are situated in the optical path of the display between the light source and the reflective polarizer, the reversed light is depolarized and interacts again with the reflective polarizer as described above. Depolarization can also occur due to internal reflection and refraction in and between the optical components of the display.

Therefore the liquid crystal display according to a preferred embodiment of the invention comprises a diffuser sheet situated between the backlight and the reflective polarizer in order to optimise the angular distribution of the light incident on the reflective polarizer.

In another preferred embodiment the inventive liquid crystal display comprises one or more adhesion layers provided to the reflective and linear polarizer, the optical compensator and the diffuser sheet.

In another preferred embodiment of the invention the liquid crystal display device comprises one or more protective layers provided to the reflective and linear polarizer, the optical compensator, the diffuser sheet and the adhesion layer in order to protect these components against environmental influence.

The function of the inventive reflective polarizer is further explained by FIG. 1, which illustrates an exemplary embodiment of the invention. The main direction of light following the optical path is from the left side to the right side. The figure shows a display device 10 with a side-lit backlight unit 11 with a lamp 12 and a combined light guide and reflector 13, a diffusion sheet 14 and an inventive polarizer combination consisting of a reflective polarizer 15, a quarter wave retardation sheet 16 and a linear polarizer 17. The figure further depicts a liquid crystal cell 18 and a second linear polarizer 19 behind the display cell.

Light emitted from the backlight 11 is interacting in a substantial part with the reflective polarizer 15. Half of the intensity of the interacted light is transmitted as right-handed or left-handed circular polarized light respectively, whereas the other half is reflected as circular polarized light of the opposite handedness. The reflected light is depolarized by the diffusor 14 and redirected by the reflector 13 onto the reflective polarizer 15. The main part of the transmitted component is converted by the retardation sheet 16 into linear polarized light. Light which is not ideally linear polarized, such as elliptically polarized light, is cut off by the linear polarizer 17. The linear polarized light then passes through the display 18 and the second linear polarizer 19 to reach the viewer 20.

The brightness gain when using a polarizer combination according to the present invention is preferably at least 50% or higher, in particular preferably at least 70% or higher.

The brightness gain in this connection means the ratio of
 a) the intensity of light which is transmitted after passing through an assembly consisting of the backlight 11, the diffusor 14, the reflective polarizer 15, the quarter wave retardation sheet 16 and the linear polarizer 17 as described in FIG. 1 and
 b) the intensity of light transmitted by an assembly consisting of the backlight 11 and the linear polarizer 17.

The brightness gain is dependent on the efficiency of the light source to re-reflect rays of light. The preferred value given above is relating to an efficient light source such as a conventional side-lit or meander backlight.

The measured brightness gain also depends on the sample size of the reflective polarizer covering the entire area of the backlight. If the backlight is only partially covered, the brightness gain decreases due to some of the light that is reflected back from the polarizer subsequently escaping from the system.

Apart from backlit displays, the reflective polarizer and the polarizer combination according to the present invention can also be applied in a reflective display. Such a display as a light source makes use of a reflector that reflects radiation generated outside the display. The invention thus also relates to a reflective liquid crystal display device comprising an inventive reflective polarizer.

The polymerizable mesogenic compounds are preferably selected of formula I

P—(Sp)$_n$—MG—R      I wherein
P is a polymerizable group,
Sp is a spacer group having 1 to 20 C atoms,
n is 0 or 1,
MG is a mesogenic or mesogenity supporting group, preferably linked to the spacer group Sp and the organic group R by an ester or ether group or a single bond, this mesogenic group being preferably selected of formula II.

—(A$^1$—Z$^1$)$_m$—A$^2$—Z$^2$—A$^3$—      II wherein
A$^1$, A$^2$ and A$^3$ are independently from each other 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene or naphthalene-2,6-diyl, it being possible for all these groups to be unsubstituted, mono- or polysubstituted with halogen, cyano or nitro groups or alkyl, alkoxy or alkanoyl groups having 1 to 7 C atoms wherein one or more H atoms may be substituted by F or Cl,
Z$^1$ and Z$^2$ are each independently —COO—, —OCO—, —CH$_2$CH$_2$—, —OCH$_2$—, —CH$_2$O—, —CH=CH—, —C≡C—, —CH=CH—COO—, —OCO—CH=CH— or a single bond and
m is 0, 1 or 2, and
R is an alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO— —OCO—, —OCO—O—, —S—CO—, —CO—S— or —C≡C— in such a manner that oxygen atoms are not linked directly to one another, or alternatively R is halogen, cyano or has independently one of the meanings given for P—(Sp)$_n$—.

In the compounds of formula I P is preferably selected from CH$_2$=CW—COO—, WCH=CH—O—,

or CH$_2$=CH—Phenyl-(O)$_k$—, with W being H, CH$_3$ or Cl and k being 0 or 1.

P is preferably a vinyl group, an acrylate or methacrylate group, a propenyl ether group, a styrene group or an epoxy group. Especially preferably P is an acrylate or methacrylate group.

Particularly preferred are polymerizable mixtures comprising at least two polymerizable mesogenic compounds at least one of which is a compound of formula I.

In another preferred embodiment of the invention the polymerizable mesogenic compounds are selected according to formula I, wherein R has one of the meanings of P—(Sp)$_n$— as given above.

Bicyclic and tricyclic mesogenic compounds are preferred.

Of the compounds of formula I especially preferred are those in which R is F, Cl, cyano, or optionally halogenated alkyl or alkoxy, or has the meaning given for P—(Sp)$_n$—. Further preferred are compounds wherein MG is of formula II with Z$^1$ and Z$^2$ being each independently —COO—, —OCO—, —CH$_2$—CH$_2$—, —CH=CH—COO—, —OCO—CH=CH— or a single bond.

A smaller group of preferred mesogenic groups of formula II is listed below. For reasons of simplicity, Phe in these groups is 1,4-phenylene, Phe L is a 1,4-phenylene group which is substituted by at least one group L, with L being F, Cl, CN or an optionally fluorinated alkyl, alkoxy or alkanoyl group with 1 to 4 C atoms, and Cyc is 1,4-cyclohexylene.

—Phe—Z$^2$—Phe—      II-1
—Phe—Z$^2$—Cyc—      II-2
—PheL—Z$^2$—Phe—      II-3
—PheL—Z$^2$—Cyc—      II-4
—Phe—Z$^2$—PheL—      II-5
—Phe—Z$^1$—Phe—Phe—      II-6
—Phe—Z$^1$—Phe—Cyc—      II-7
—Phe—Z$^1$—Phe—Z$^2$—Phe—      II-8
—Phe—Z$^1$—Phe—Z$^2$—Cyc—      II-9
—Phe—Z$^1$—Cyc—Z$^2$—Phe—      II-10
—Phe—Z$^1$—Cyc—Z$^2$—Cyc—      II-11
—Phe—Z$^1$—PheL—Z$^2$—Phe—      II-12
—Phe—Z$^1$—Phe—Z$^2$—PheL—      II-13
—PheL—Z$^1$—Phe—Z$^2$—PheL—      II-14
—PheL—Z$^1$—PheL—Z$^2$—Phe—      II-15
—PheL—Z$^1$—PheL—Z$^2$—PheL—      II-16

In these preferred groups Z$^1$ and Z$^2$ have the meaning given in formula I described above. Preferably Z$^1$ and Z$^2$ are —COO—, —OCO—, —CH$_2$CH$_2$—, —CH=CH—COO— or a single bond.

L is preferably F, Cl, CN, NO$_2$, CH$_3$, C$_2$H$_5$, OCH$_3$, OC$_2$H$_5$, COCH$_3$, COC$_2$H$_5$, CF$_3$, OCF$_3$, OCHF$_2$, OC$_2$F$_5$, in particular F, Cl, CN, CH$_3$, C$_2$H$_5$, OCH$_3$, COCH$_3$ and OCF$_3$, most preferably F, CH$_3$, OCH$_3$ and COCH$_3$.

Particularly preferred are compounds wherein MG is selected from the following formulae

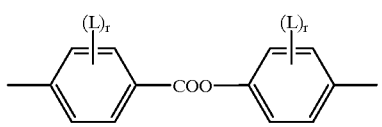

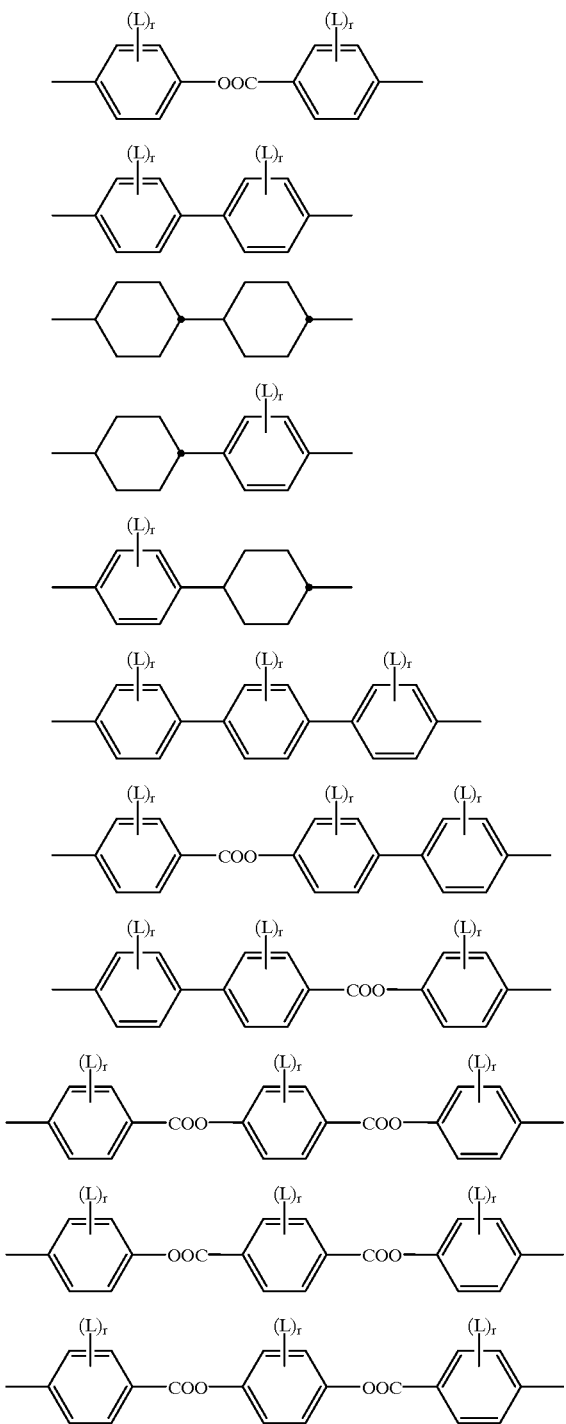

wherein L has the meaning given above and r is 0, 1 or 2.
The group

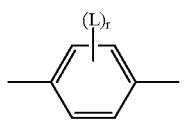

in this preferred formulae is very preferably denoting

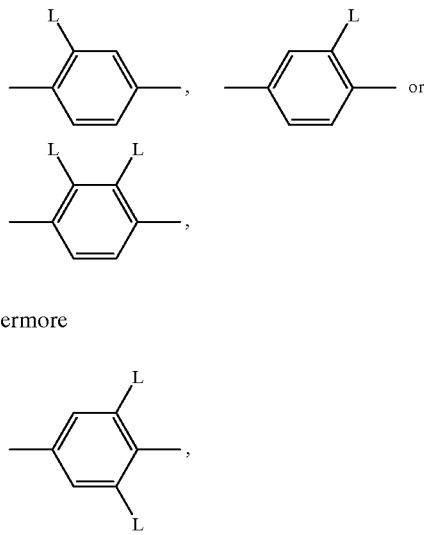

furthermore with L having each independently one of the meanings given above.

R in these preferred compounds is particularly preferably CN, F, Cl, OCF$_3$ or an alkyl or alkoxy group with 1 to 12 C atoms or has one of the meanings given for P—(Sp)$_n$—.

If R in formula I is an alkyl or alkoxy radical, i.e. where the terminal CH$_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, methoxy, dodecoxy, tridecoxy or tetradecoxy, for example.

Oxaalkyl, i.e. where one CH$_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2- 3-, 4-, 5-, 6-, 7- or 8-oxanonyl or 2-, 3-, 4-, 5-, 6-, 7-, 8- or 9-oxadecyl, for example.

In the polymerizable mesogenic compounds of formula I R may be an achiral or a chiral group. In case of a chiral group it is preferably selected according to the following formula III:

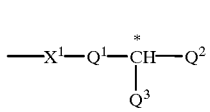

III wherein
X$^1$ is —O—, —S—, —CO—, —COO—, —OCO—, —OCOO— or a single bond,
Q$^1$ is an alkylene or alkylene-oxy group with 1 to 10 C atoms or a single bond,
Q$^2$ is an alkyl or alkoxy group with 1 to 10 C atoms which may be unsubstituted, mono- or polysubstituted by halogen or CN, it being also possible for one or more non-adjacent CH$_2$ groups to be replaced, in each case independently from one another, by —C≡C—, —O—, —S—, —NH—, —N(CH₃)—, —CO—, —COO—, —OCO—, —OCO—O—, —S—CO— or —CO—S— in such a manner that oxygen atoms are not linked directly to one another, or alternatively has the meaning given for P—Sp—, Q³ is halogen, a cyano group or an alkyl or alkoxy group with 1 to 4 C atoms different from Q².

Preferred chiral groups R are 2-butyl (=1-methylpropyl), 2-methylbutyl, 2-methylpentyl, 3-methylpentyl, 2-ethylhexyl, 2-propylpentyl, 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, for example.

In addition, mesogenic compounds of the formula I containing an achiral branched group R may occasionally be of importance as comonomers, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl propoxy and 3-methyl butoxy.

In another preferred embodiment R in formula I is denoting a chiral group that is selected from the following groups:

an ethylenglycol derivative

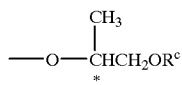

wherein $R^c$ is an alkyl radical with 1 to 12 C atoms, or a group based on citronellol.

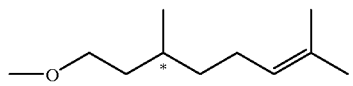

In another object of the present invention the compounds of formula I comprise a mesogenic or mesogenity supporting group MG having at least one center of chirality. In these compounds MG is preferably selected according to formula IIa:

$$—(A^1—Z^1)_i—G \qquad \text{IIa}$$

wherein $A^1$ and $Z^1$ have the meaning given in formula II, i is 0, 1 or 2, and G is a terminal chiral group, such as for example

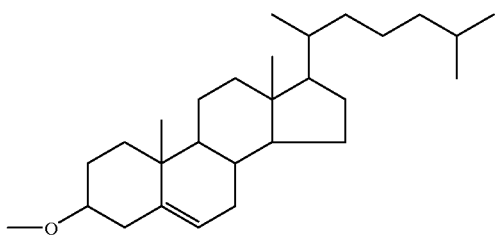

a cholesteryl group
or a terpenoid radical like, for example, menthol

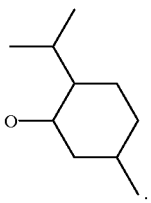

The compounds of formula IIa1

$$P—(Sp—X)_n—(A^1—Z^1)_j—G \qquad \text{IIa1}$$

wherein
P, Sp, X and n have the meanings given in formula I,
$A^1$ and $Z^1$ have the meanings of formula II, j is 1 or 2, and G is denoting

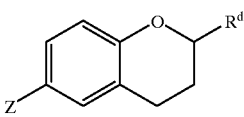

with $R^d$ being $C_1$–$C_{12}$ alkyl or alkoxy and Z being —COO— or —O—CO—, are new and are a further object of the present application.

As for the spacer group Sp in formula I all groups can be used that are known for this purpose to the skilled in the art. The spacer group Sp is preferably a linear or branched alkylene group having 1 to 20 C atoms, in particular 1 to 12 C atoms, in which, in addition, one or more non-adjacent CH₂ groups may be replaced by —O—, —S—, —NH—, —N(CH₃)—, —CO—, —O—CO—, —S—CO—, —O—COO—, —CO—S—, —CO—O—, —CH (halogen)—, —CH(CN)—, —CH=CH— or —C≡C—.

Typical spacer groups Sp are for example —(CH₂)ₒ—, —(CH₂CH₂O)ᵣ—, —CH₂CH₂—, —CH₂CH₂—S—CH₂CH₂ or —CH₂CH₂—NH—CH₂CH₂—, with o being an integer from 2 to 12 and r being an integer from 1 to 3.

Preferred spacer groups Sp are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene and 1-methylalkylene, for example.

Preferably the spacer group and the mesogenic group MG in formula I are linked by a group selected from —O—, —S—, —CO—, —COO—, —OCO—, —OCOO— or by a single bond.

In a preferred embodiment of the invention the polymerizable mesogenic compounds of formula I comprise a spacer group Sp that is a chiral group of the formula IV:

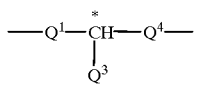
IV wherein $Q^1$ and $Q^3$ have the meanings given in formula III, and $Q^4$ is an alkylene or alkylene-oxy group with 1 to 10 C atoms or a single bond, being different from $Q^1$.

In particular preferred are compounds of formula I wherein n is 1.

In the event that R is a group of formula P—Sp—, the spacer groups on each side of the mesogenic core may be identical or different.

In particular preferred are compounds of formula I wherein n is 1.

In another preferred embodiment, the inventive compensator is obtained by copolymerizing mixtures comprising compounds of formula I wherein n is 0 and compounds of formula I wherein n is 1.

In case of chiral compounds the groups Sp and/or MG and/or R are selected such that they contain a chiral C atom, or alternatively chirality is arising from a group inducing molecular asymmetry, such as e.g. a binaphthalene group with restricted rotation.

Typical examples representing chiral and achiral polymerizable mesogenic compounds of the formula I can be found in WO 93/22397; EP 0,261,712; DE 195,04,224; DE 4,408,171 or DE 4,405,316. The compounds disclosed in these documents, however are to be regarded merely as examples that should not limit the scope of this invention.

Furthermore, typical examples representing achiral and chiral polymerizable mesogenic compounds are shown in the following list of compounds. This list is, however, to be understood only as illustrative without limiting the scope of the present invention:

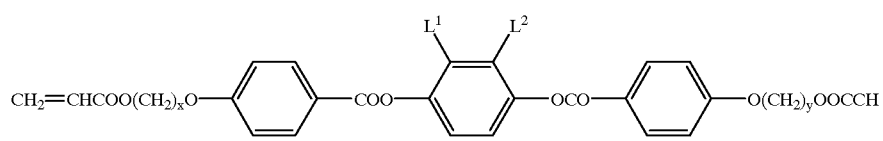
(1)

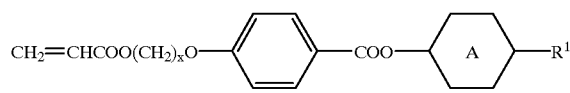
(2)

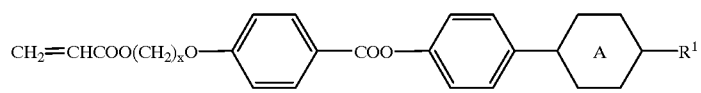
(3)

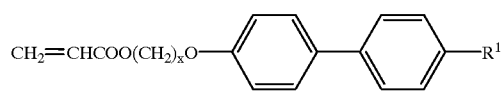
(4)

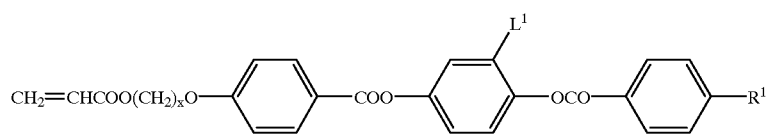
(5)

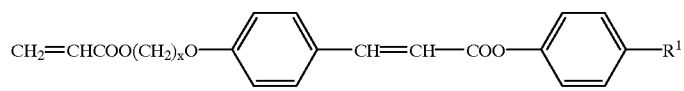
(6)

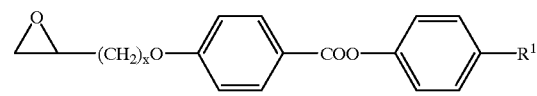
(7)

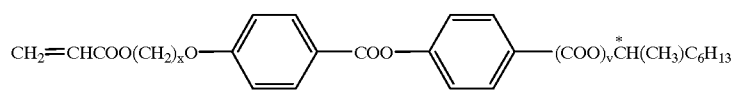
(8)

-continued

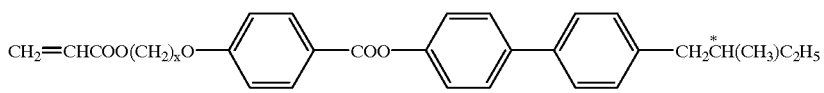
(9)

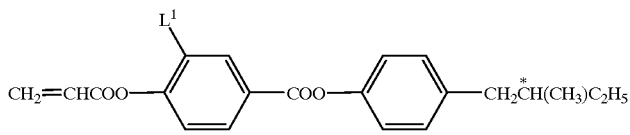
(10)

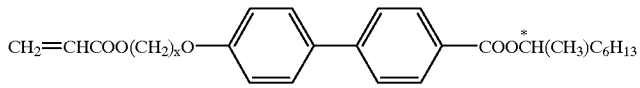
(11)

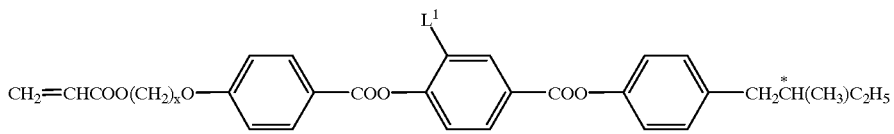
(12)

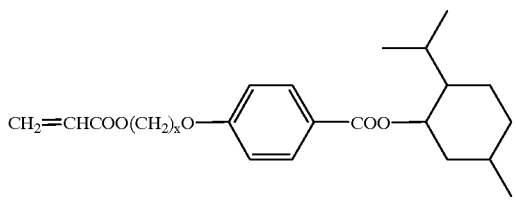
(13)

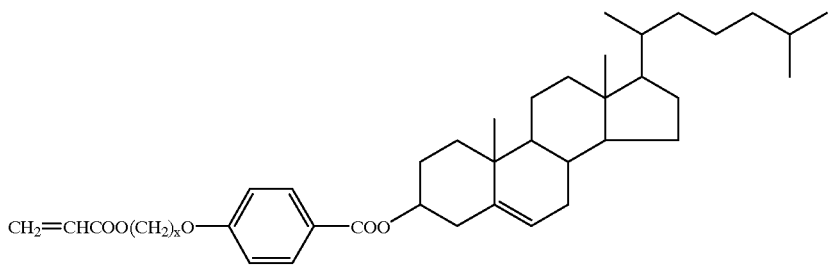
(14)

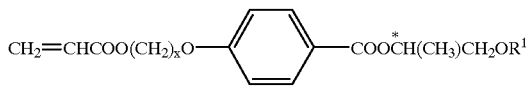
(15)

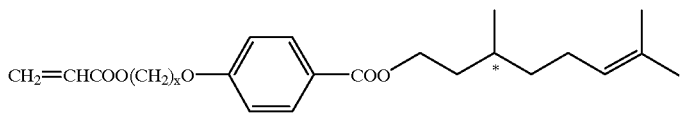
(16)

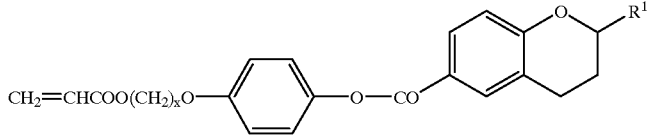
(17)

In these compounds x and y are each independently 1 to 12, v is 0 or 1, A is a 1,4-phenylene or 1,4-cyclohexylene group, $R^1$ is halogen, cyano or an optionally halogenated alkyl or alkoxy group with 1 to 12 C atoms and $L^1$ and $L^2$ are each independently H, F, Cl, CN, or an optionally halogenated alkyl, alkoxy or alkanoyl group with 1 to 7 C atoms.

The polymerizable mesogenic compounds disclosed in the foregoing and the following can be prepared by methods which are known per se and which are described in the documents cited above and, for example, in standard works of organic chemistry such as, for example, Houben-Weyl, Methoden der organischen Chemie, Thieme-Verlag, Stuttgart.

Another object of the present invention are the following chiral polymerizable mesogenic mixtures:

mixtures essentially consisting of
- a1) 5 to 85%, preferably 8 to 70% by weight of at least one achiral monoreactive compound of formula I,
- a2) 2 to 60%, preferably 4 to 45% by weight of an achiral direactive compound of formula I,
- b) 10 to 80%, preferably 15 to 75% by weight of at least one chiral monoreactive compound of formula I,
- c) 0.1 to 5%, preferably 0.2 to 3% by weight of a photoinitiator,
- d) 0 to 5%, preferably 0 to 3% by weight of a non-polymerizable chiral dopant and
- e) 10 to 1000 ppm of a stabilizer.

From these preferred mixtures those are particularly preferred that contain one chiral monoreactive compound of formula I. Further preferred are mixtures that contain two to four chiral monoreactive compounds of formula I.

mixtures essentially consisting of
- a1) 15 to 85%, preferably 25 to 75% by weight of at least two achiral monoreactive compounds of formula I,
- b) 10 to 85%, preferably 20 to 75% by weight of at least one chiral monoreactive compound of formula I,
- c) 0.1 to 5%, preferably 0.2 to 3% by weight of a photoinitiator,
- d) 0 to 5%, preferably 0 to 3% by weight of a non-polymerizable chiral dopant and
- e) 10 to 1000 ppm of a stabilizer.

From these preferred mixtures those are particularly preferred that contain two to eight, in particular two to six, very preferably two, three or four monoreactive achiral compounds of formula I.

mixtures essentially consisting of
- a2) 10 to 85% preferably 15 to 65% by weight of an achiral direactive compound of formula I,
- b) 10 to 90% preferably 30 to 80% by weight of a chiral monoreactive compound of formula I,
- c) 0.1 to 5%, preferably 0.2 to 3% by weight of a photoinitiator,
- d) 0 to 5%, preferably 0.2 to 3% by weight of a non-polymerizable chiral dopant,
- e) 10 to 1000 ppm of a stabilizer,
- f) 0 to 5%, preferably 0 to 3% of a chain transfer agent and
- g) 0 to 5%, preferably 0 to 3% of a dye.

From these preferred mixtures those are particularly preferred that contain no dye.

mixtures essentially consisting of
- a1) 5 to 85%, preferably 10 to 70% by weight of an achiral monoreactive compound of formula I, and/or
- a2) 5 to 70% preferably 10 to 55% by weight of an achiral direactive compound of formula I,
- b) 10 to 85% preferably 20 to 80% by weight of a chiral monoreactive compound of formula I,
- c) 0.1 to 5%, preferably 0.2 to 3% by weight of a photoinitiator,
- d) 0 to 5%, preferably 0.2 to 3% by weight of a non-polymerizable chiral dopant,
- e) 10 to 1000 ppm of a stabilizer and
- h1) 2 to 70%, preferably 3 to 50% by weight of a non-mesogenic polymerizable compound having one polymerizable group, and/or
- h2) 2 to 70%, preferably 3 to 50% by weight of a non-mesogenic polymerizable compound having two or more polymerizable groups.

From these preferred mixtures particularly preferred are those comprising component a1) together with component h2) and those comprising component a2) together with component h1).

mixtures essentially consisting of
- a1) 5 to 90%, preferably 15 to 85% by weight of at least one achiral monoreactive compound of formula I,
- a2) 2 to 70%, preferably 5 to 60% by weight of an achiral direactive compound of formula I,
- c) 0.1 to 5%, preferably 0.2 to 3% by weight of a photoinitiator,
- d) 0.5 to 25%, preferably 1 to 15% by weight of a non-polymerizable chiral dopant and
- e) 10 to 1000 ppm of a stabilizer.

From these preferred mixtures those are particularly preferred that contain two to eight, in particular two to six, very preferably two, three or four monoreactive achiral compounds of formula I.

The polymerizable compounds of formula I in the mixtures according to the preferred embodiments described above are preferably selected of the preferred formulae II-1 to II-16, with the radicals in these formulae having the preferred meanings given above. Particularly preferably the polymerizable compounds in these preferred mixtures are selected of the exemplary formula (1) to (17) given above.

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

The entire disclosure of all applications, patents and publications, cited above and below, are hereby incorporated by reference.

In the foregoing and in the following examples, all temperatures are set forth uncorrected in degrees Celsius and unless otherwise indicated, all parts and percentages are by weight. The following abbreviations are used to illustrate the liquid crystalline phase behaviour of the compounds:

K=crystalline; N=nematic; S=smectic; Ch=cholesteric; I=isotropic. The numbers between these symbols indicate the phase transition temperatures in degree Celsius.

EXAMPLE 1

| compound (A) | 65.0% monoreactive chiral compound |
|---|---|
| compound (B) | 33.0% direactive achiral compound |
| Darocure 4265 | 1.0% photoinitiator |
| Tinuvin 400 | 1.0% dye |

To this mixture, 400 ppm of the stabilizer 2,6 di(t-butyl)-4-hydroxytoluene (BHT) are added to prevent premature polymerization.

The preparation of compound (A) is described in DE 195,04,224. The direactive compound (B) can be prepared in an analogy to the synthesis of the compounds described in WO 93/22397.

Darocure 4265 is a photoinitiator for radicalic photopolymerization consisting of 50% TPO (triacylphosphinoxide) and 50% of the photoinitiator D1173 (D2959), Tinuvin 400 is a UV absorbing dye, all being commercially available from Ciba Geigy AG, Basel, Switzerland.

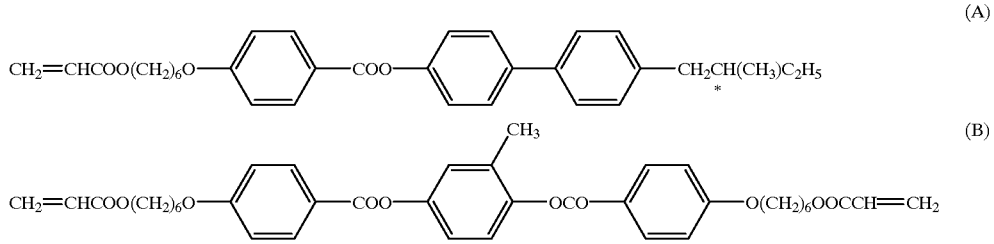

The mixture exhibits the mesophase behaviour K 72 Ch 121 I.

To manufacture a reflective polarizer the mixture is coated onto a PET film in form of a layer, sheared (e.g. by means of a doctor blade or of a roller) and covered by a second PET film. The mixture is then photopolymerized by irradiation with UV light using a Philips TL05 UV lamp with an irradiance of 0.15 mW/cm² for 5 minutes at a temperature of 90° C.

A threedimensional network is formed during polymerization. The polymerized film is then removed from the substrate.

The bandwidth of the reflective polarizer is measured on a Hitachi U2000 spectrophotometer using a circular polarizer to provide circularly polarized light of the same sense as the cholesteric helix of the sample. This light is reflected by the sample to give the low transmission trace (b) of the measured spectrum. A second trace is measured with circularly polarized light of the opposite sense to the cholesteric helix This light is transmitted by the sample (high transmission trace) to provide the baseline (a) of the spectrum.

Figure 2:
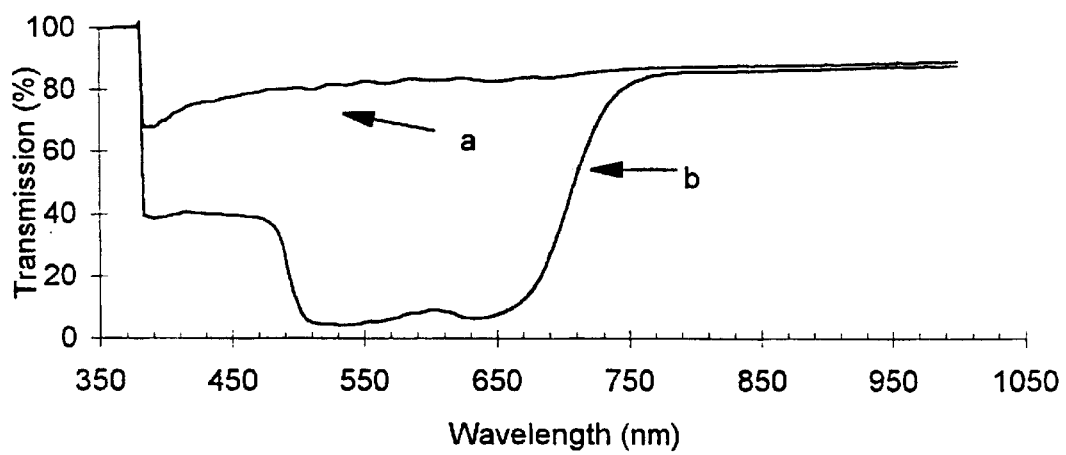
FIG. 2 shows a transmission spectrum with a) indicating the transmitted and b) the reflected light of an inventive reflective polarizer obtained according to example 1 of the invention.

FIG. 2 shows the transmission spectrum of the polarizer obtained as described above. The polarizer exhibits a broad reflection band between 490 and 750 nm.

The brightness gain of the reflective polarizer prepared as described above is measured by comparing the luminance of a backlight fitted with a dichroic polarizer to that of the same backlight fitted with the reflective polarizer, a quarter wave foil and a dichroic polarizer. The QWF must be oriented such that the direction of polarization of the light is aligned with the transmission axis of the dichroic polarizer.

The backlight used for the measurement is an LDE 06T-22, available from Flat Panel Display Co. B.V. The luminance is measured using a Minolta CS-100 colormeter. The reference polarizer is a Sanritz LLC2-9218. The brightness gain is 72.2%.

EXAMPLE 2

A number of mixtures is formulated similar to that of example 1 but with the following dye concentrations:

| mixture | 2a | 2b | 2c | 2d |
|---------|----|----|----|----|
| dye conc. | 0% | 0.5% | 1.0% | 1.5% |

In these mixtures, the concentration of compound (B) is subsequently reduced in order to balance the composition to 100%.

Figure 3:
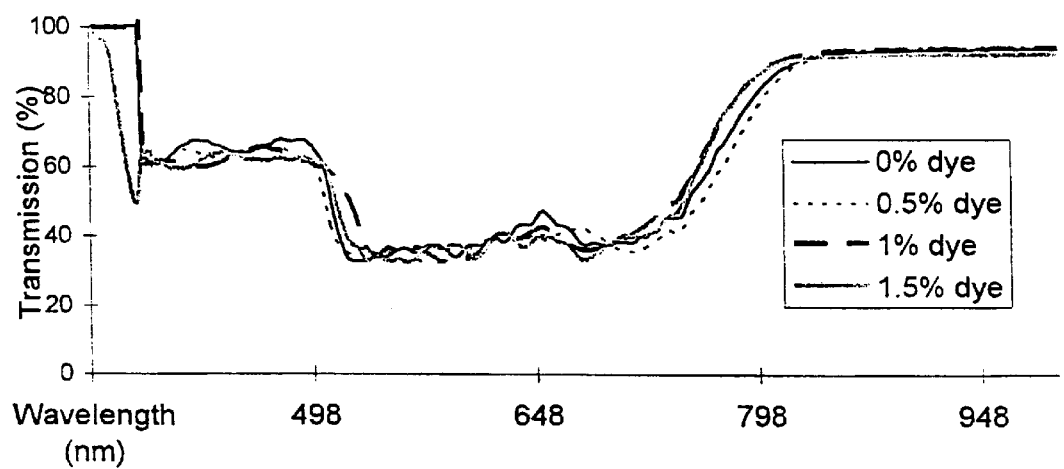
FIG. 3 shows transmission spectra of inventive reflective polarizers with varying concentrations of an UV dye obtained according to example 2 of the invention.

A number of polarizers is prepared from the mixtures as described in example 1. FIG. 3 shows the transmission spectra (low transmission trace) of the polarizers. It can be seen that the dye concentration has no remarkable influence on the polarization characteristic. Even without using a dye a broad bandwidth of about 300 nm can be achieved.

EXAMPLE 3

Figure 4:
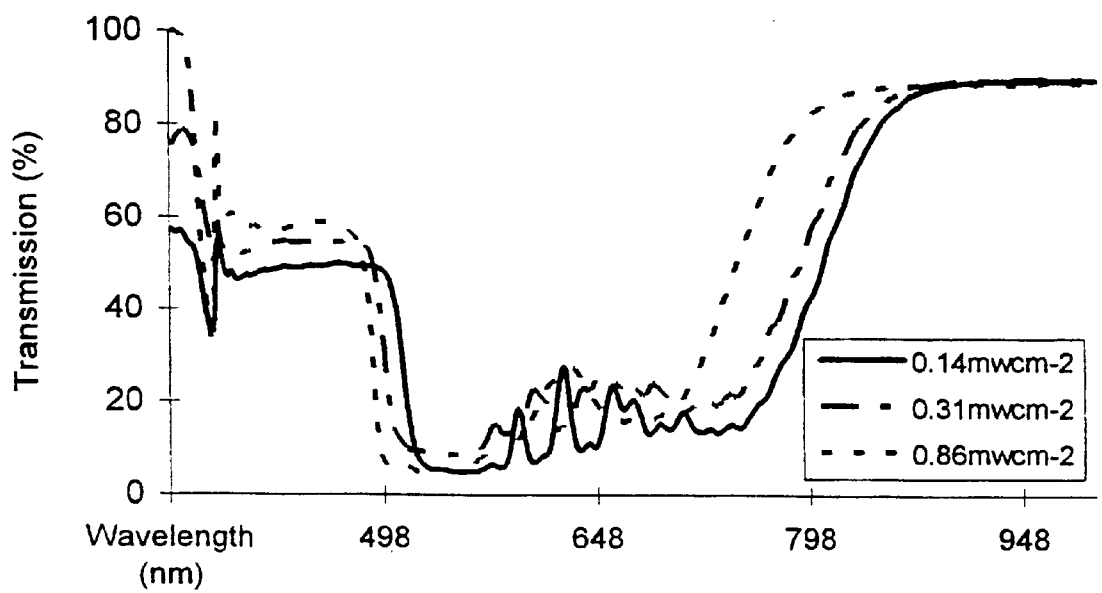
FIG. 4 shows transmission spectra of inventive reflective polarizers obtained according to example 3 of the invention when curing with different irradiances of the UV lamp.

A mixture is formulated similar to the mixture of example 1 but without a dye. Three polarizers are manufactured as described in example 1, but applying different UV lamp powers. FIG. 4 shows the transmission spectra (low transmission trace) of the three polarizers obtained by curing with an irradiance of 0.14 mW/cm², 0.31 mW/cm² and 0.86 mW/cm² respectively. With increasing lamp power the spectra are shifted slightly towards lower values of the wavelength, however, there is no considerable influence on the bandwidth.

EXAMPLE 4

Figure 5:
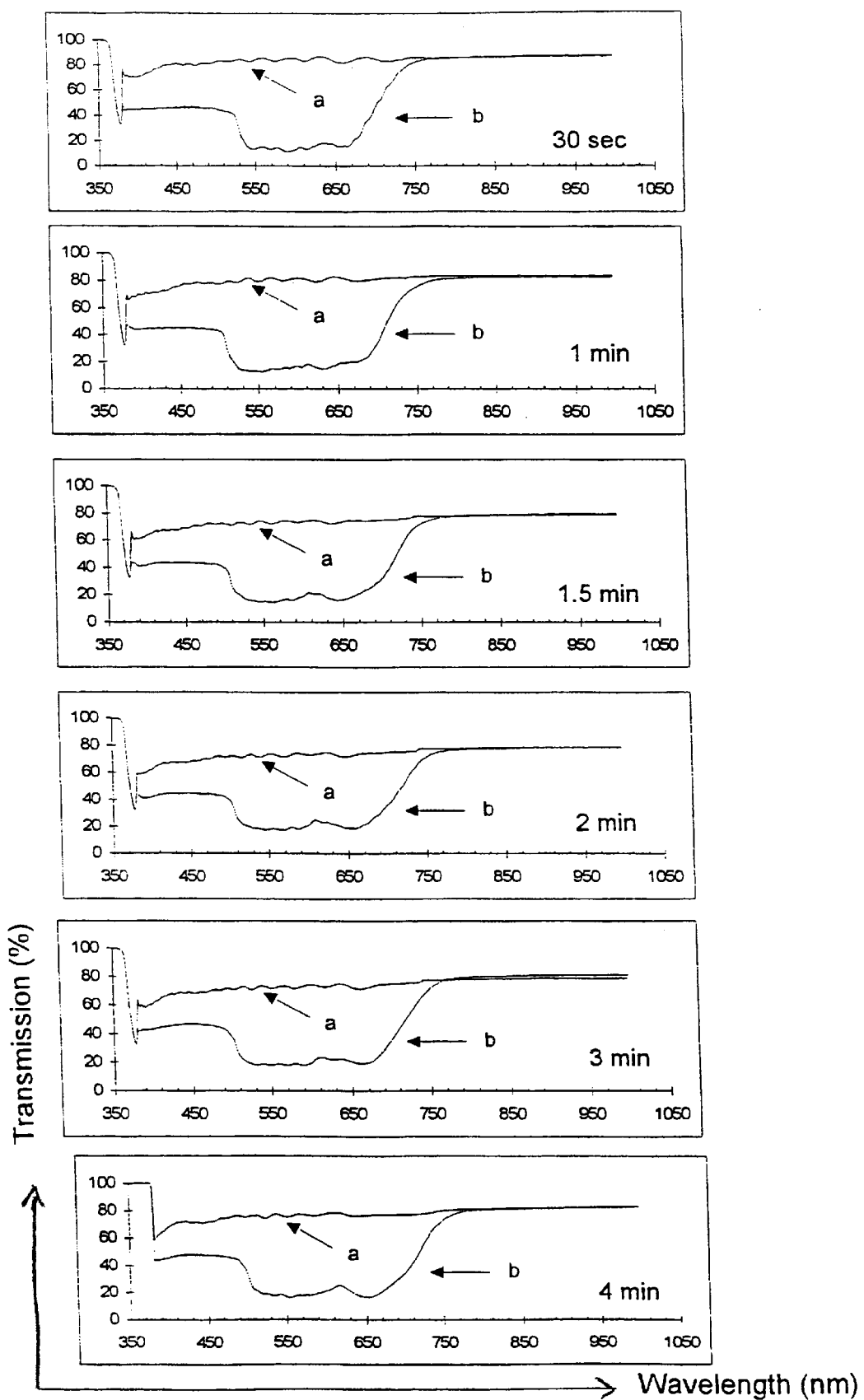
FIG. 5 shows transmission spectra with a) indicating the transmitted and b) the reflected light of inventive reflective polarizers obtained according to example 4 of the invention at different curing times.

A number of polarizers was manufactured as described in example 1 using the mixture 2b from example 2 with different curing times. FIG. 5 shows the transmission spectra of the polarizers. The spectra show that after a curing time of 1.5 minutes no substantial change in the bandwidth can be observed.

EXAMPLE 5

A mixture is formulated consisting of

| | | |
|---|---|---|
| compound (A) | 65.0% | monoreactive chiral compound |
| compound (B) | 33.0% | directive achiral compound |
| Irgacure 261 | 1.0% | photoinitiator |
| Tinuvin 400 | 1.0% | dye |
| BHT | 400 ppm | stabilizer |

Irgacure 261 is a photoinitiator commercially available from Ciba Geigy.

A reflective polarizer is manufactured as described in example 1. A threedimensional network is formed during polymerization. The polymerized film is then removed from the substrate.

Figure 6:
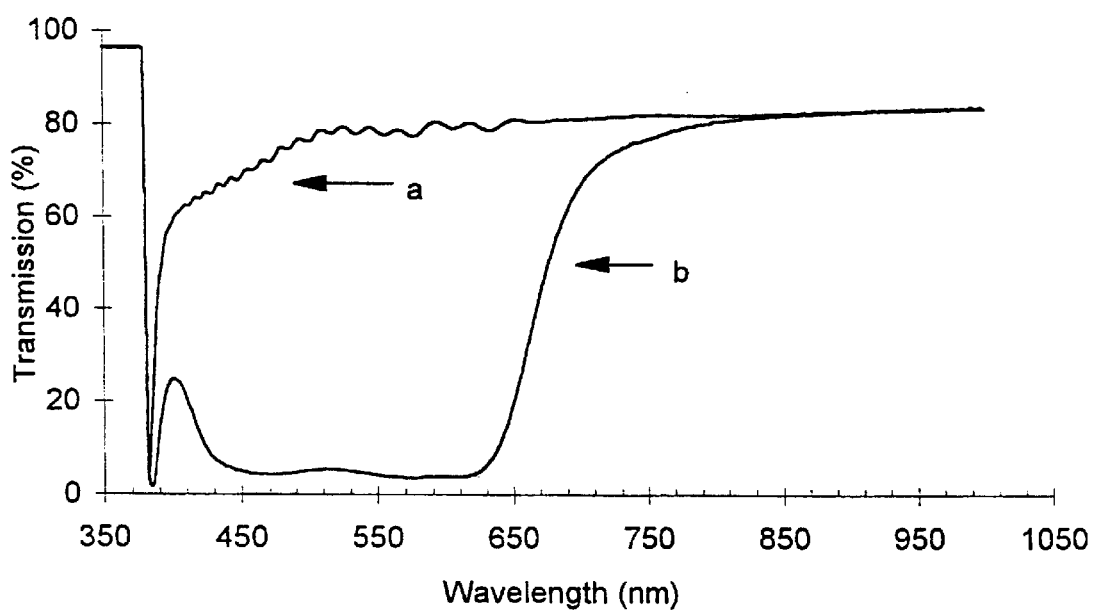
FIG. 6 shows a transmission spectrum with a) indicating the transmitted and b) the reflected light of an inventive reflective polarizer obtained according to example 5 of the invention.

FIG. 6 shows the transmission spectrum of the polarizer. A broad reflection waveband with a bandwidth of about 320 nm is obtained.

EXAMPLE 6

A number of polarizers is prepared from a mixture similar to that of example 5 but with 2.5% dye at different curing times.

Figure 7:
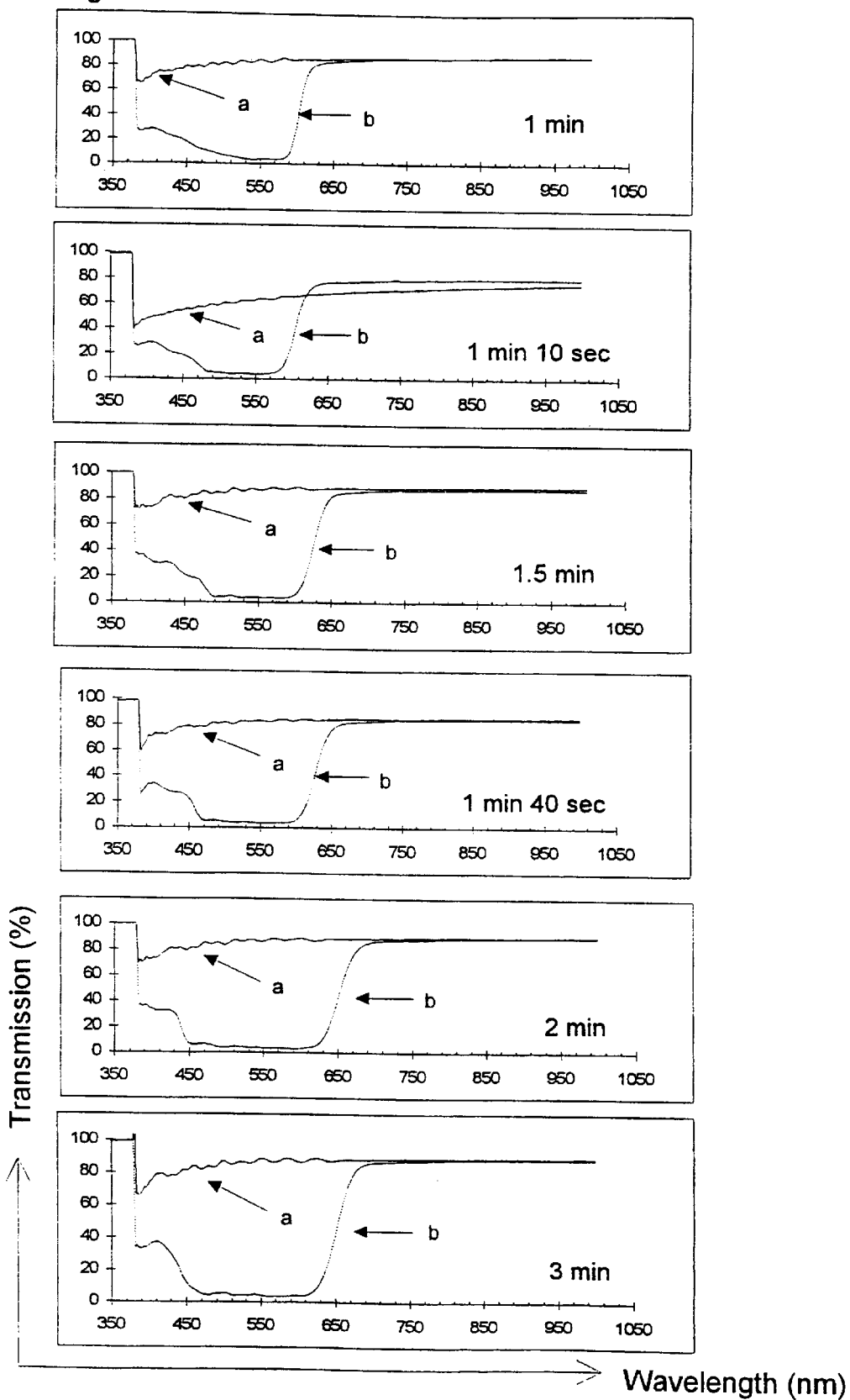
FIG. 7 shows transmission spectra with a) indicating the transmitted and b) the reflected light of inventive reflective polarizers obtained according to example 6 of the invention at different curing times.

FIG. 7 shows the transmission spectra of the polarizers. It can be seen that after curing times exceeding 2 minutes there is no substantial change in the bandwidth.

EXAMPLE 7

A mixture is formulated consisting of

| | |
|---|---|
| compound (C) | 55.0% monoreactive chiral compound |
| compound (D) | 26.4% monoreactive achiral compound |
| compound (E) | 17.6% monoreactive achiral compound |
| KB 1 | 1.0% photoinitiator |

The preparation of compound (C) is described in DE 195,04,224. The compounds (D) and (E) can be prepared in an analoguous manner.

KB1 is a modification of the commercially available photoinitiator Irgacure 651 from Ciba Geigy.

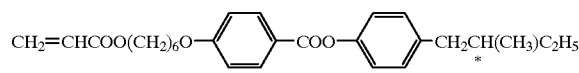
(C)

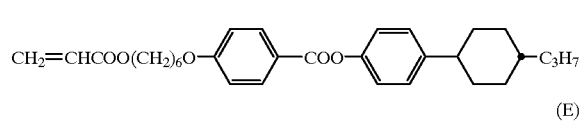
(D)

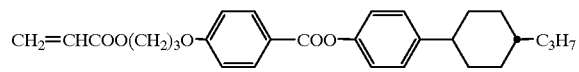
(E)

The mixture contains only monoreactive mesogenic compounds and no dye.

The mixture is melting below room temperature and exhibits the mesophase behaviour Ch 67 I.

Two polarizers are prepared by coating, aligning and curing the mixture as described in principle in example 1 on two different substrates. In one case PET films and in the other case glass sheets are used. The curing temperature is 45° C., the irradiance 1.6 mW/cm² and the curing time 5 minutes.

Figure 8:
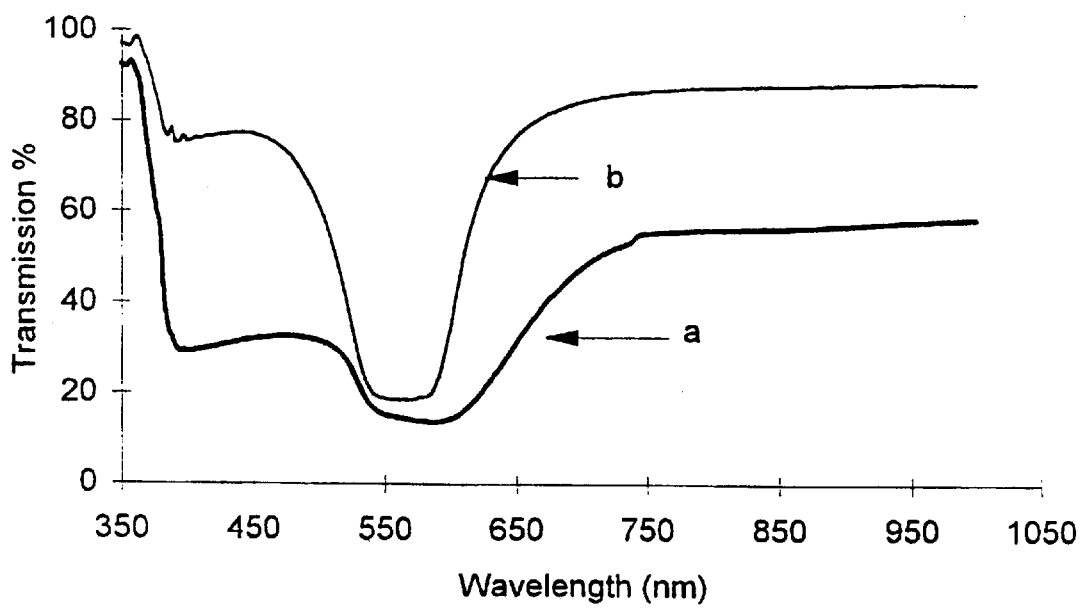
FIG. 8 shows transmission spectra of inventive reflective polarizers obtained according to example 7 of the invention when cured on different substrates.

FIG. 8 shows the transmission spectra (low transmission trace) of the polarizers cured on a PET film (a) and on a glass sheet (b). When using a glass substrate, a narrow band of about 50 nm is obtained, whereas curing on a PET film gives a polarizer with a bandwidth of about 350 nm. In the latter case the spectrum has a bimodal distribution with two main reflection maxima at 400 and 600 nm respectively.

Thus a broadband polarizer can be manufactured without using a direactive mesogenic compound and a dye.

EXAMPLE 8

A mixture is formulated consisting of

| | |
|---|---|
| compound (C) | 55.0% monoreactive chiral compound |
| compound (D) | 39.0% monoreactive achiral compound |
| compound (F) | 5.0% direactive achiral compound |
| KB 1 | 1.0% photoinitiator |

The direactive compound (F) can be prepared in an analoguous manner to the compounds described in WO 93/22397.

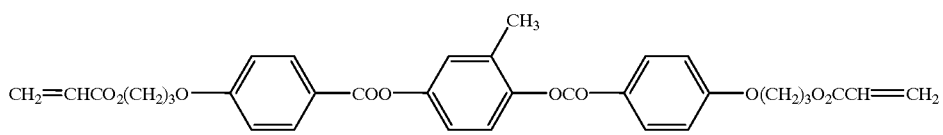
(F)

The mixture exhibits the mesophase behaviour Ch 65 I.

Two polarizers are manufactured by curing this mixture on PET and glass substrates respectively as described in example 7. The temperature is 50° C. and the curing time 5 minutes using an irradiance of 0.2 mW/cm².

Figure 9:
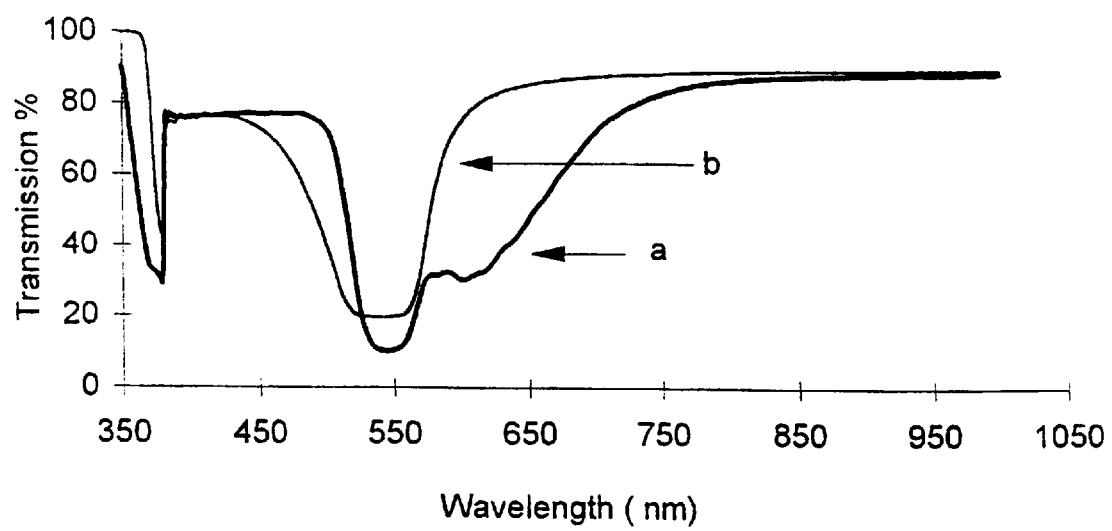
FIG. 9 shows transmission spectra of inventive reflective polarizers obtained according to example 8 of the invention when cured on different substrates.

FIG. 9 shows the transmission spectra (low transmission trace) of the polarizers cured on on a PET film (a) and on a glass sheet (b). When using a glass substrate, a narrow band of about 50 nm is obtained, whereas curing on a PET film gives a polarizer with a bimodal reflection band of about 200 nm bandwidth.

From the preceding examples it can be seen that when curing on a PET substrate the dye has no significant influence on the bandwidth of the reflective polarizer. Furthermore, a reflective polarizer with a broad bandwidth can be prepared on a plastic substrate applying short curing times and even without using a dye or a direactive polymerizable mesogenic compound, which is clearly distinctive from and advantageous over prior art.

EXAMPLE 9

The following mixture is formulated

| | |
|---|---|
| compound (A) | 26.0% monoreactive chiral compound |
| compound (B) | 28.0% direactive achiral compound |
| compound (C) | 34.0% monoreactive chiral compound |
| compound (D) | 11.0% monoreactive achiral compound |
| Irgacure 184 | 1.0% photoinitiator |

Irgacure 184 is commercially available from Ciba Geigy.

Figure 10:
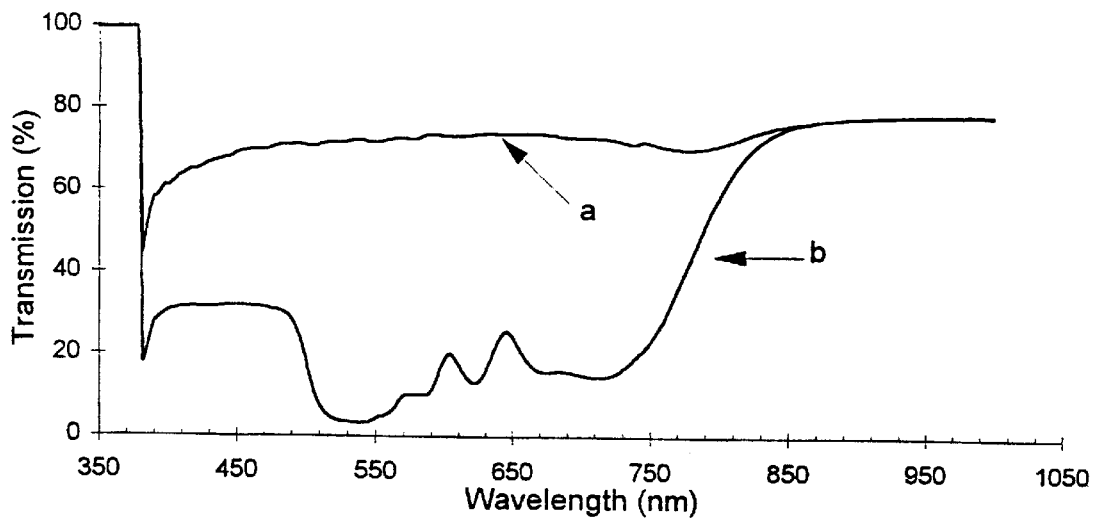
FIG. 10 shows a transmission spectrum with a) indicating the transmitted and b) the reflected light of an inventive reflective polarizer obtained according to example 9 of the invention.

The mixture exhibits the mesophase behaviour K 56 N 80.8 I and supercools to room temperature without crystallisation. A reflective polarizer is prepared from this mixture in analogy to the method described in example 1. The transmission spectrum of the film is shown in FIG. 10 and exhibits a broad reflection band between 490 nm and 810 nm.

EXAMPLE 10

A mixture is formulated consisting of

| | |
|---|---|
| compound (A) | 65.0% monoreactive chiral compound |
| compound (B) | 34.6% direactive achiral compound |
| Irgacure 184 | 1.0% photoinitiator |

Figure 11:
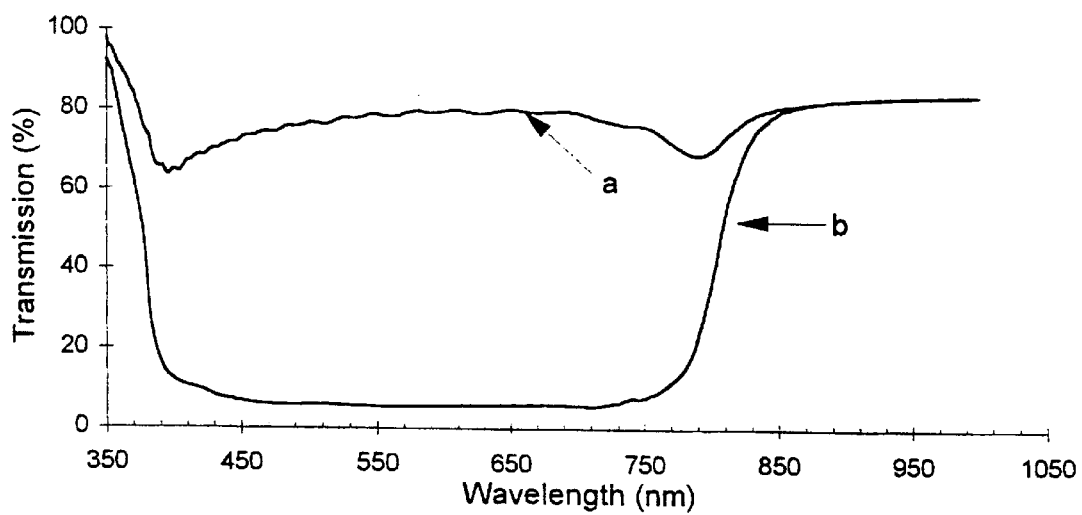
FIG. 11 shows a transmission spectrum with a) indicating the transmitted and b) the reflected light of an inventive reflective polarizer obtained according to example 10 of the invention.

The mixture exhibits the mesophase behaviour K 72 N 121 I. A reflective polarizer is prepared from this mixture analogy to the method described in example 1. The transmission spectrum of the film is shown in FIG. 11 and exhibits a broad reflection band between 400 nm and 810 nm

EXAMPLE 11

The following mixtures are formulated
a) mixture 11a consisting of

| | |
|---|---|
| compound (A) | 65.00% monoreactive chiral compound |
| compound (B) | 33.52% direactive achiral compound |
| compound (G) | 0.50% chiral dopant |
| TPO | 0.40% photoinitiator |
| Irgacure 2959 | 0.54% photoinitiator |
| BHT | 0.04% stabilizer |

Irgacure 261 is commercially available from Ciba Geigy.

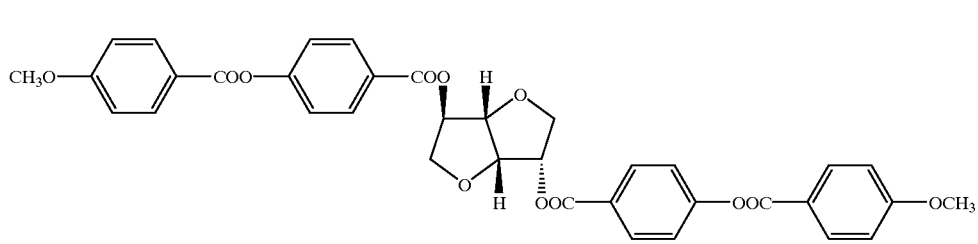
(G)

Compound (G) was prepared according to reaction scheme 1. It exhibits the phase behaviour K 139 I and shows a very high HTP of 75 $\mu m^{-1}$, which has been determined in the commercially available nematic liquid crystal mixture E 063 (available from Merck Ltd., Poole, UK) as a host mixture.
b) mixture 11b, which is similar to mixture 11a, but contains only 32.52% of compound (B), and additionally contains 1.0% of dodecane thiol as a transfer agent.

A reflective polarizer film is prepared from each of mixture 11a and 11b in analogy to the method described in example 1. Both films exhibit a broad transmission spectrum with the following values of the reflection wavelength

| | 11a | 11b |
|---|---|---|
| $\lambda_{min}$ | 470 nm | 462 nm |
| $\lambda_{max}$ | 675 nm | 737 nm |
| $\Delta\lambda$ | 205 nm | 275 nm |

The film which was prepared from the mixture comprising a chain transfer agent shows an increased bandwidth.

EXAMPLE 12

The following mixture is formulated

| | |
|---|---|
| compound (A) | 65.0% monoreactive chiral compound |
| compound (B) | 33.7% direactive achiral compound |
| compound (G) | 0.5% chiral dopant |
| Darocure 4265 | 0.8% photoinitiator |
| BHT | 400 ppm stabilizer |

Figure 12:
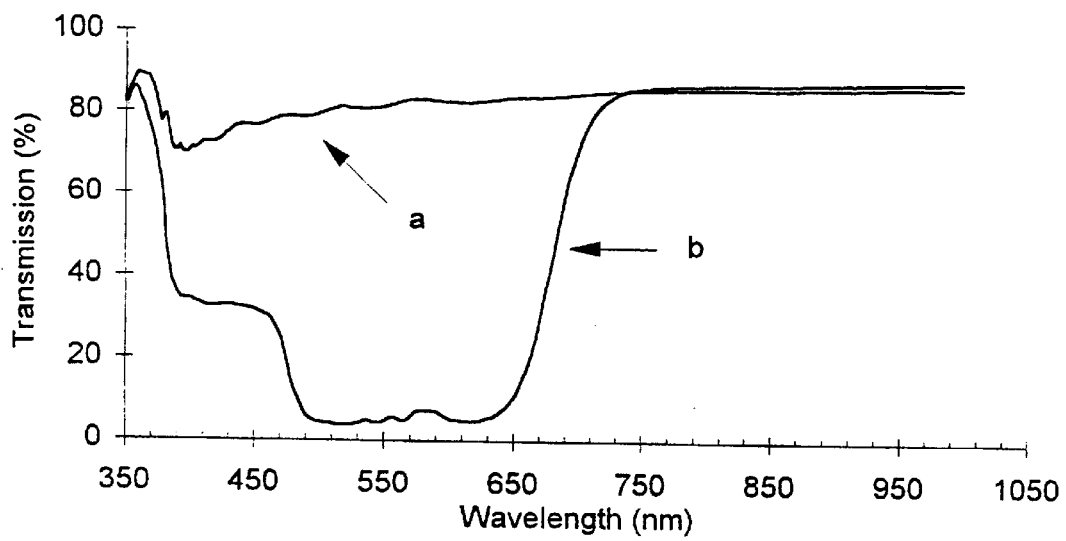
FIGS. 12 to 19 each show a transmission spectrum with a) indicating the transmitted and b) the reflected light of an inventive reflective polarizer obtained according to the respective example of the invention carrying the same number.

A reflective polarizer is prepared from this mixture as described in example 1. The transmission spectrum of the film is shown in FIG. 12 and exhibits a broad reflection band between 460 and 740 nm, which is shifted to shorter wavelengths when compared to that of example 1.

EXAMPLE 13

A mixture is formulated similar to that of example 12, but with 5% of compound (A) replaced by the analoguous methacrylate compound (H).

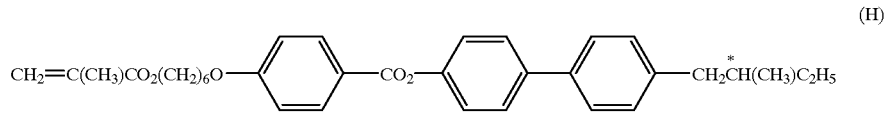
(H)

Figure 13:
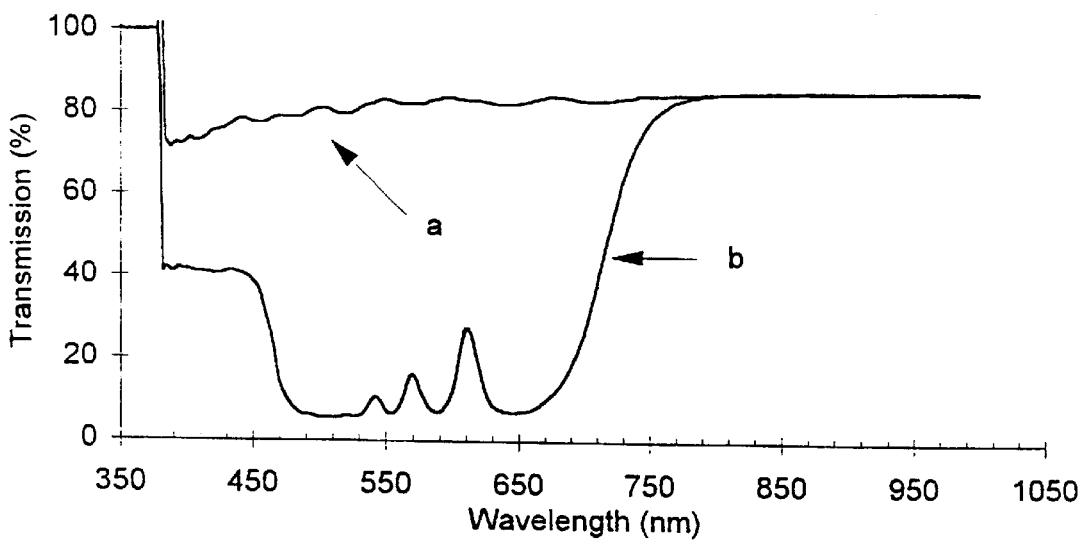

The preparation of compound (H) is described in DE 195,04,224. A reflective polarizer is prepared from this mixture as described in example 1. The transmission spectrum of the film is shown in FIG. 13 and exhibits a broad reflection band which is significantly wider than that of example 1.

EXAMPLE 14

The following mixture is formulated

| compound (A) | 30.0% | monoreactive chiral compound |
| compound (B) | 25.0% | direactive achiral compound |
| compound (G) | 2.0% | chiral dopant |
| compound (I) | 42.0% | monoreactive achiral compound |
| Irgacure 184 | 1.0% | photoinitiator |
| BHT | 400 ppm | stabilizer |

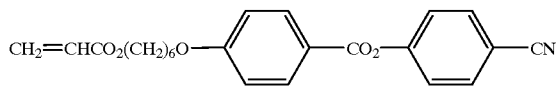

(I)

Compound (I) can be prepared analoguously to compound (H). the preparation of which is described in the DE 195, 04,224.

Figure 14:
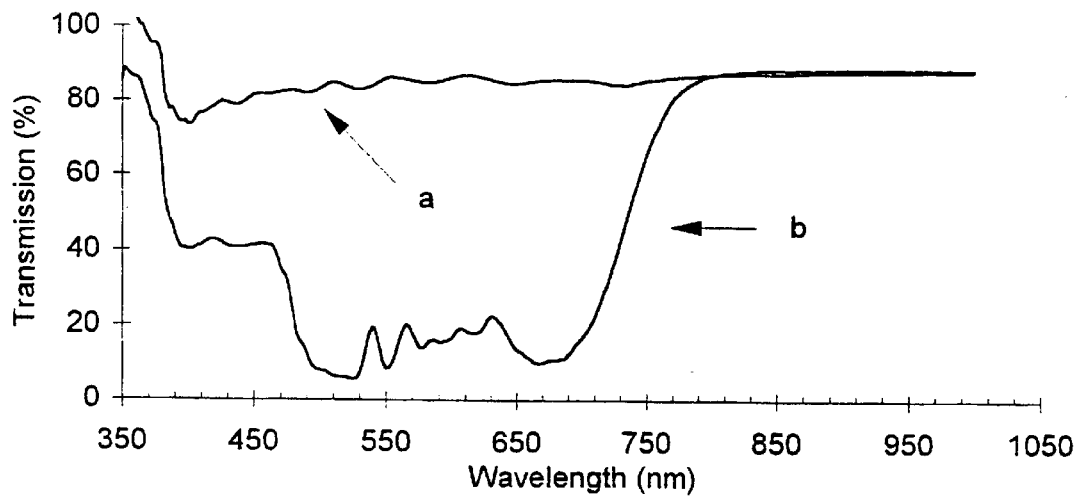

A reflective polarizer is prepared from this mixture as described in example 1. The transmission spectrum of the film is shown in FIG. 14 and exhibits a broad reflection band between 460 and 790 nm.

EXAMPLE 15

The following mixture is formulated

| compound (A) | 65.0% monoreactive chiral compound |
| compound (B) | 23.7% direactive achiral compound |
| compound (D) | 10.0% monoreactive achiral compound |
| compound (G) | 0.5% chiral dopant |
| Darocur 4265 | 0.8% photoinitiator |
| BHT | 400 ppm stabilizer |

Figure 15:
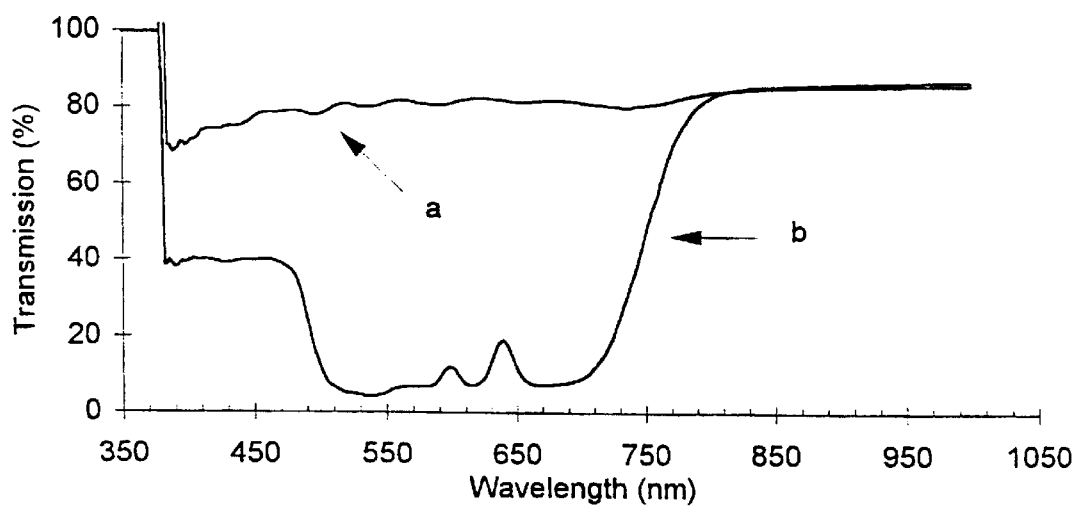

A reflective polarizer is prepared from this mixture as described in example 1. The transmission spectrum of the film is shown in FIG. 15 and exhibits a broad reflection band between 475 and 805 nm which is significantly wider than that of example 12.

EXAMPLE 16

A mixture is formulated that is similar to that of example 12, but contains only 28.7% of compound (B) and additionally contains 5.0% of 2-ethylhexyl methacrylate as an achiral non-mesogenic monoreactive component (commercially available from Aldrich).

Figure 16:
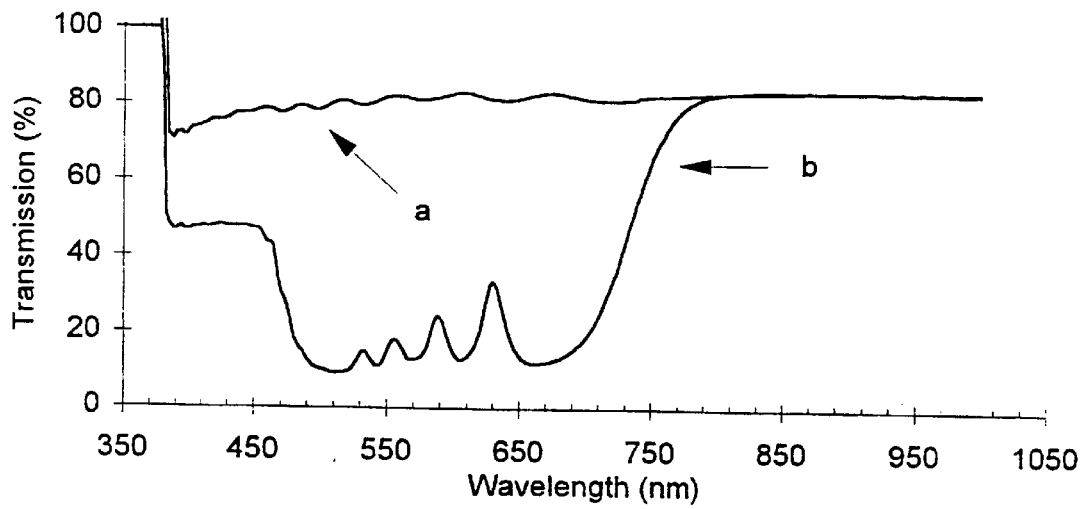

A reflective polarizer is prepared from this mixture as described in example 1. The transmission spectrum of the film is shown in FIG. 16 and exhibits a broad reflection band between 460 and 790 nm which is significantly wider than that of example 12.

EXAMPLE 17

A mixture is formulated similar to that of example 16, but with the 2-ethylhexyl methacrylate replaced by 2-ethylhexyl acrylate (commercially available from Aldrich).

Figure 17:
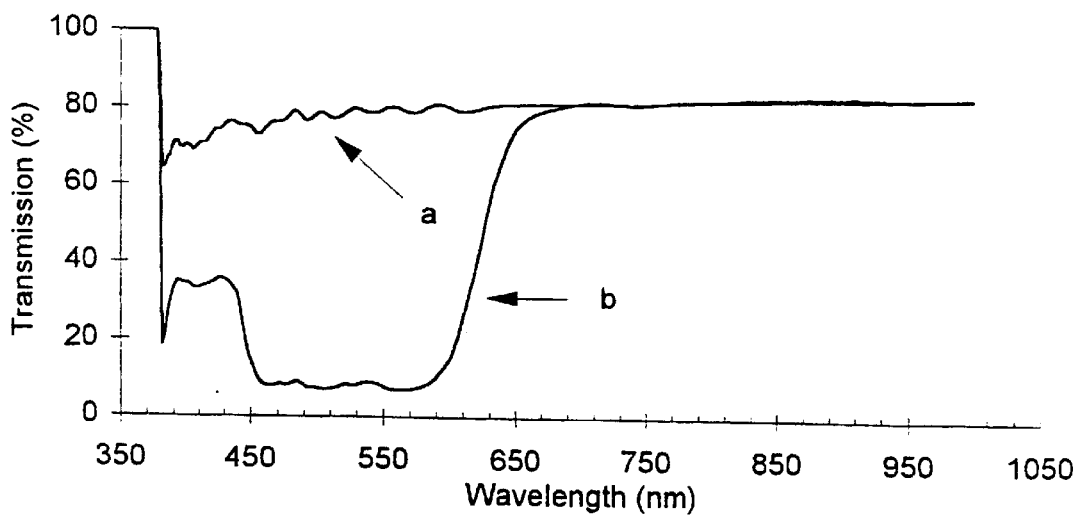

A reflective polarizer is prepared from this mixture as described in example 1. The transmission spectrum of the film is shown in FIG. 17 and exhibits a broad reflection band between 430 and 690 nm which is narrower than that of example 16 and shifted to shorter wavelengths.

EXAMPLE 18

A mixture is formulated similar to that of example 12, but with the direactive achiral component (B) replaced by a mixture of a monoreactive achiral compound and a non-mesogenic direactive achiral compound hexanediol diacrylate (commercially available from Aldrich).

Figure 18:
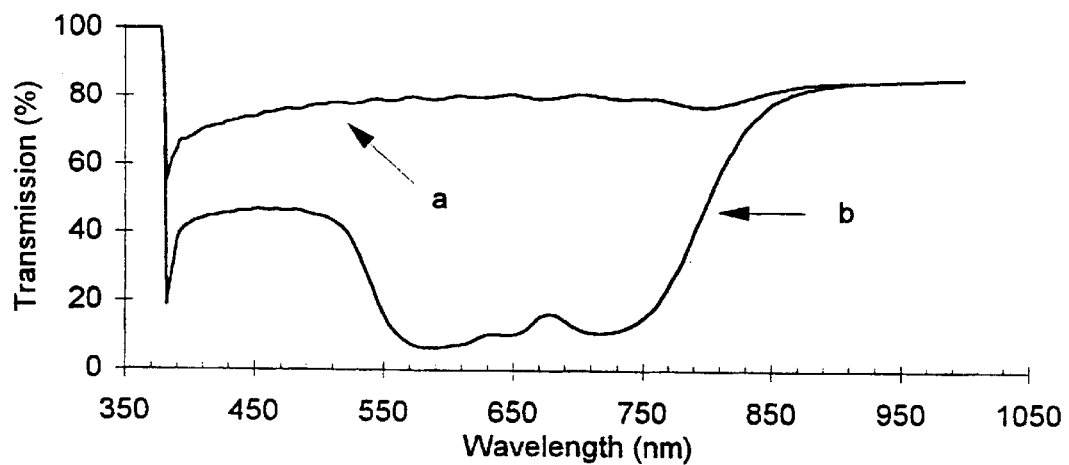

A reflective polarizer is prepared from this mixture as described in example 1. The transmission spectrum of the film is shown in FIG. 18 and exhibits a broad reflection band between 500 and 850 nm.

EXAMPLE 19

The following mixture is formulated

| compound (B) | 24.45% direactive achiral compound |
| compound (D) | 40.00% monoreactive achiral compound |
| compound (I) | 30.00% monoreactive achiral compound |
| compound (G) | 4.75% chiral dopant |
| Darocur 4265 | 0.8% photoinitiator |
| BHT | 400 ppm stabilizer |

In this mixture, compared to the examples 1 to 18 the chiral monoreactive compound is completely replaced by a combination of a chiral non-reactive compound and an achiral monoreactive compound.

Figure 19:
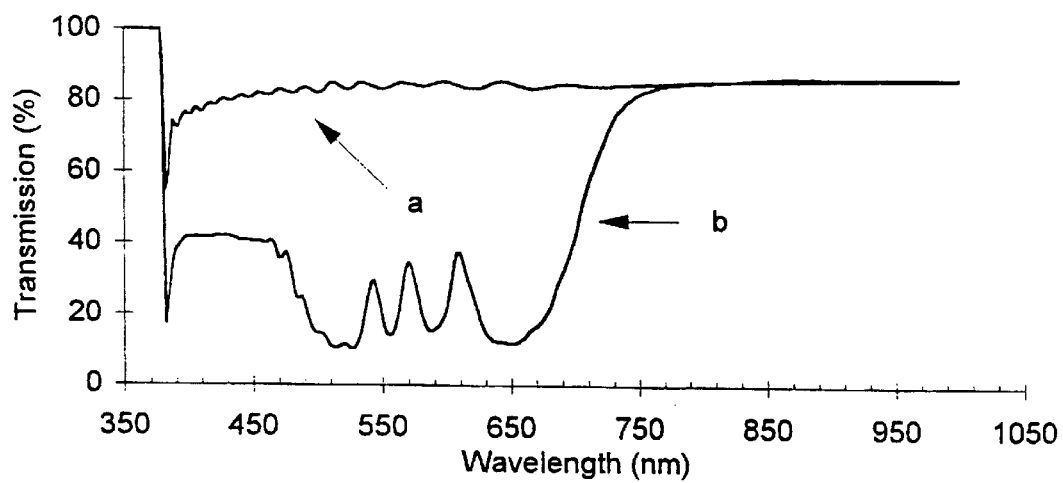

A reflective polarizer is prepared from this mixture as described in example 1. The transmission spectrum of the film is shown in FIG. 19 and exhibits a broad reflection band between 460 and 770 nm.

The preceding examples can be repeated with similar success by substituting the generically or specifically described reactants andlor operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A liquid crystal display device comprising a liquid crystal cell and at least one reflective polarizer or a polarizer combination comprising at least one reflective polarizer as a means to generate circular polarized light, said reflective polarizer comprising an optically active layer of an anisotropic polymer material with a helically twisted planar molecular orientation, wherein the material is oriented so that the axis of the molecular helix extends transversely to the layer, in which the pitch of the molecular helix is varied in such a manner that the difference between the maximum pitch and the minimum pitch is at least 100 nm, characterized in that said reflective polarizer is obtainable by copolymerization of a mixture of a chiral polymerizable mesogenic material comprising a) at least one achiral polymerizable mesogenic compound having at least one polymerizable functional group in the presence of
b) at least one chiral polymerizable mesogenic compound having one polymerizable functional group and/or at least one non-polymerizable chiral mesogenic compound, c) an initiator,
d) optionally a non-mesogenic compound having at least one polymerizable functional group,
e) optionally a dye and
f) optionally a stabilizer.

2. A liquid crystal display device comprising a liquid crystal cell and at least one reflective polarizer or a polarizer combination comprising at least one reflective polarizer as a means to generate circular polarized light, said reflective polarizer comprising an optically active layer of an anisotropic polymer material with a helically twisted planar molecular orientation, wherein the material is oriented so that the axis of the molecular helix extends transversely to the layer, in which the pitch of the molecular helix is varied in such a manner that the difference between the maximum pitch and the minimum pitch is at least 100 nm, wherein the reflective polarizer is obtained by copolymerization of a mixture of a chiral polymerizable mesogenic material comprising a) at least one achiral polymerizable mesogenic compound having at least one polymerizable functional group in the presence of
b) at least one chiral polymerizable mesogenic compound having one polymerizable functional group and/or at least one non-polymerizable chiral mesogenic compound,
c) an initiator,
d) optionally a non-mesogenic compound having at least one polymerizable functional group,
e) optionally a dye and
f) optionally a stabilizer, wherein the spectrum of light transmitted by the reflective polarizer has an at least bimodal peak distribution.

3. A liquid crystal display device as claimed in claim 1, characterized in that it comprises at least one optical retardation film, the retardation of which is approximately 0.25 times the wavelength of the band reflected by the reflective polarizer.

4. A liquid crystal display device as claimed in claim 1, which comprises a linear polarizer.

5. A liquid crystal display device as claimed in claim 1, characterized in that the linear polarizer is situated in such a manner that the angle between the optical axis of the polarizer and the major optical axis of the retardation film is from 30 to 60 degrees.

6. A reflective polarizer comprising an optically active layer of an anisotropic polymer material with a helically twisted planar molecular orientation, wherein the material is oriented so that the axis of the molecular helix extends transversely to the layer, in which the pitch of the molecular helix is varied in such a manner that the difference between the maximum pitch and the minimum pitch is at least 100 nm, characterized in that said reflective polarizer is obtainable by A) coating a mixture of a chiral polymerizable mesogenic material comprising
 a) at least one achiral polymerizable mesogenic compound having at least one polymerizable functional group in the presence of
 b) at least one chiral polymerizable mesogenic compound having one polymerizable functional group and/or at least one non-polymerizable chiral mesogenic compound,
 c) an initiator,
 d) optionally a non-mesogenic compound having at least one polymerizable functional group,
 e) optionally a dye and
 f) optionally a stabilizer on at least one substrate in form of a layer,
B) aligning said mixture in an orientation so that the axis of the molecular helix extends transversely to the layer,
C) polymerizing said mixture by exposing it to heat or actinic radiation, and
D) optionally removing one or both of the substrates from the polymerized material.

7. A reflective polarizer as claimed in claim 6, characterized in that the polymerized material forms a three-dimensional network.

8. A reflective polarizer as claimed in claim 6, characterized in that the polarization bandwidth is larger than 250 nm.

9. A reflective polarizer as claimed in claim 6, characterized in that at least one substrate is a plastic film.

10. A reflective polarizer as claimed in claim 6, characterized in that the chiral polymerizable mesogenic material contains at least one chiral polymerizable mesogenic compound having one polymerizable functional group and at least one achiral polymerizable mesogenic compound having one polymerizable functional group.

11. A reflective polarizer as claimed in claim 6, characterized in that the chiral polymerizable mesogenic material contains at least one chiral polymerizable mesogenic compound having one polymerizable functional group and at least one achiral polymerizable mesogenic compound having two or more polymerizable functional groups.

12. A reflective polarizer as claimed in claim 6, characterized in that the mixture of a chiral polymerizable mesogenic material essentially consists of 5 to 85% by weight of an achiral polymerizable mesogenic compound having one polymerizable functional group,
0 to 30% by weight of an achiral polymerizable mesogenic compound having two or more polymerizable functional groups,
10 to 80% by weight of a chiral polymerizable mesogenic compound having one polymerizable functional group,
0.1 to 5% by weight of an initiator,
0 to 10% by weight of a non-polymerizable chiral dopant,
0 to 5% by weight of a dye and
10 to 1000 ppm of a stabilizer.

13. A reflective polarizer as claimed in claim 6, characterized in that the mixture of a chiral polymerizable mesogenic material essentially consists of 10 to 85% by weight of an achiral polymerizable mesogenic compound having two or more polymerizable functional groups,
10 to 90% by weight of a chiral polymerizable mesogenic compound having one polymerizable functional group,
0.1 to 5% by weight of an initiator,
0 to 10% by weight of a non-polymerizable chiral dopant,
0 to 5% by weight of a dye and
10 to 1000 ppm of a stabilizer.

14. A reflective polarizer as claimed claim 6, characterized in that the mixture of a chiral polymerizable mesogenic material essentially consists of 0 to 85% by weight of an achiral polymerizable mesogenic compound having one polymerizable functional group,
0 to 70% by weight of an achiral polymerizable mesogenic compound having two or more polymerizable functional groups, 10 to 80% by weight of a chiral polymerizable mesogenic compound having one polymerizable functional group, 3 to 70% by weight of a non-mesogenic polymerizable compounds having at least one polymerizable functional group, 0.1 to 5% by weight of an initiator, 0 to 10% by weight of a non-polymerizable chiral dopant, 0 to 5% by weight of a dye and 10 to 1000 ppm of a stabilizer.

15. A reflective polarizer as claimed in claim 6, wherein the polymerizable mesogenic compounds are selected from those of formula I $$P-(Sp)_n-MG-R \qquad \text{I}$$

wherein

P is a polymerizable group,

Sp is a spacer group having 1 to 20 C atoms, n is 0 or 1,

MG is a mesogenic or mesogenity supporting group, m is 0, 1 or 2, and R is an alkyl radical with 1 to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —OCO—O—, —S—CO—, —CO—S— or —C≡C— in such a manner that oxygen atoms are not linked directly to one another, or alternatively R is halogen, cyano or has independently one of the meanings given for P—(Sp)$_n$—.

16. A polymerizable mesogenic compound of the following formula $$P-(Sp-X)_n-(A^1-Z^1)_j-G \qquad \text{IIa1}$$

wherein

P is a polymerizable group,

SP is a spacer group having 1 to 20 C atoms,

X is —O—, —S—, —CO—, —COO—, —OCO—, —OCOO—, or a single bond, n is 0 or 1, $A^1$ is 1,4-phenylene in which, in addition, one or more CH groups may be replaced by N, 1,4-cyclohexylene in which, in addition, one or two non-adjacent $CH_2$ groups may be replaced by 0 and/or S, 1,4-cyclohexenylene or naphthalene-2,6-diyl, it being possible for all these groups to be unsubstituted, mono- or polysubstituted with halogen, cyano or nitro groups or alkyl, alkoxy or alkanoyl groups having 1 to 7 C atoms wherein one or more H atoms may be substituted by F or Cl, $Z^1$ is —COO—, —OCO—, —$CH_2CH_2$—, —$OCH_2$—, —$CH_2O$—, —CH=CH—, —C≡C—, —CH=CH—COO—, —OCO—CH=CH— or a single bond, j is 1 or 2, and G is

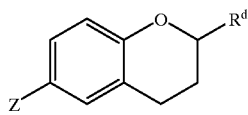

with $R_d$ being $C_1$–$C_{12}$ alkyl or alkoxy and Z being —COO— or —O—CO—.

17. A liquid crystal display device as claimed in claim 4, wherein the linear polarizer is situated in the optical path between the reflective polarizer and the liquid crystal cell.

* * * * *